US011742765B2

(12) United States Patent
Jeong et al.

(10) Patent No.: US 11,742,765 B2
(45) Date of Patent: Aug. 29, 2023

(54) POWER CONVERSION METHOD

(71) Applicant: HYOSUNG HEAVY INDUSTRIES CORPORATION, Seoul (KR)

(72) Inventors: Byung Hwan Jeong, Gwacheon-si (KR); Hae Won Seo, Seoul (KR); Byeng Joo Byen, Suwon-si (KR); Hyun Jun Kim, Incheon (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 170 days.

(21) Appl. No.: 17/299,140

(22) PCT Filed: Nov. 18, 2019

(86) PCT No.: PCT/KR2019/015757
§ 371 (c)(1),
(2) Date: Jun. 2, 2021

(87) PCT Pub. No.: WO2020/116817
PCT Pub. Date: Jun. 11, 2020

(65) Prior Publication Data
US 2022/0077759 A1 Mar. 10, 2022

(30) Foreign Application Priority Data
Dec. 7, 2018 (KR) .......................... 10-2018-0156771

(51) Int. Cl.
*H02M 3/335* (2006.01)
*H02M 1/00* (2006.01)

(52) U.S. Cl.
CPC ..... *H02M 3/33573* (2021.05); *H02M 1/0058* (2021.05); *H02M 3/33515* (2013.01); *H02M 3/33584* (2013.01)

(58) Field of Classification Search
CPC .. H02M 3/33584; H02M 1/0032; H02M 1/08; H02M 3/157; H02M 3/33515;
(Continued)

(56) References Cited

U.S. PATENT DOCUMENTS 6,101,106 A * 8/2000 Shi .................... H02M 3/33515
323/284
6,995,537 B1 * 2/2006 Plutowski ............ G11B 5/5565
318/400.29

(Continued)

FOREIGN PATENT DOCUMENTS

KR 10-2010-0115087 A 10/2010
KR 10-2016-0140064 A 12/2016
KR 10-2018-0079021 A 7/2018

OTHER PUBLICATIONS

Amit Kumar Jain et al., "PWM Control of Dual Active Bridge: Comprehensive Analysis and Experimental Verification", IEEE Transactions on Power Electronics, Apr. 4, 2011, pp. 1215-1227, vol. 26, No. 4.
Chenhao Nan et al., "Dual Active Bridge Converter with PWM Control for Solid State Transformer Application", IEEE Energy Conversion Congress and Exposition, Sep. 15, 2013, pp. 4747-4753.

*Primary Examiner* — Gustavo A Rosario-Benitez
(74) *Attorney, Agent, or Firm* — NKL Law; Jae Youn Kim

(57) ABSTRACT

A method for determining a scheme for converting power in every power conversion control period and converting power according to the determined scheme may comprise the steps of: calculating average power in a transformer inductor at the time of power conversion according to an SPWM scheme in a control period; calculating average power in the transformer inductor at the time of power conversion according to a DPWM scheme in a control period; and converting power according to a scheme by means of which the calculated average power of the transformer inductor is greater. Here, in the step of calculating the (Continued)

average power in the transformer inductor at the time of power conversion according to the DPWM scheme, it is possible to select a DPWM scheme with the maximum duty in a step-up or step-down condition given in the control period.

8 Claims, 19 Drawing Sheets

(58) Field of Classification Search
CPC .......... H02M 3/33507; H02M 1/0025; H02M 3/33573; H02M 1/0009; H02M 1/007; H02M 3/156; H02M 1/0012; H02M 3/158; H02M 3/1588; H02M 3/1586; H02M 1/0058; H02M 3/335; H02M 1/0054; H02M 1/0048
See application file for complete search history.

(56) References Cited

U.S. PATENT DOCUMENTS

| | | | |
|---|---|---|---|
| 9,800,177 B2* | 10/2017 | Ayai | H02M 3/04 |
| 2008/0304195 A1* | 12/2008 | Lin | H02M 1/4225 |
| | | | 361/89 |
| 2011/0249472 A1 | 10/2011 | Jain et al. | |
| 2012/0007576 A1* | 1/2012 | Suntio | H02M 3/1582 |
| | | | 323/312 |
| 2012/0019220 A1 | 1/2012 | Grimm | |
| 2013/0286698 A1* | 10/2013 | Lee | H02J 3/381 |
| | | | 363/71 |
| 2016/0139651 A1* | 5/2016 | Schramm | G06F 1/3287 |
| | | | 713/323 |
| 2016/0352236 A1 | 12/2016 | Yoo et al. | |
| 2018/0212520 A1* | 7/2018 | Zhang | H02M 7/5387 |

* cited by examiner

POWER CONVERSION METHOD

FIELD OF THE INVENTION

The present invention relates to a power conversion method for a DC-DC converter; and more particularly to, the power conversion method using a switching control algorithm of the bidirectional isolated DC-DC converter connected between a DC-grid system and a battery for high-efficiency control.

BACKGROUND OF THE INVENTION

Due to increasing digital load, electric vehicles, etc., the power consumption pattern recently tends to be converted from direct current (DC) to alternating current (AC), and there is increasing interest in a DC-grid system capable of maximizing an effect of distributed generation of an energy storage system (ESS) from solar or wind power.

When such DC-grid system is linked to a distributed generation system, it is possible to store surplus energy generated through new renewable sources such as solar or wind power using an ESS, and it may be used as reference DC power supply if a DC distribution system is unstable, or a power failure occurs. Accordingly, an effect of reducing the deterioration of reliability and stability caused by disruption in the power supply may be expected.

Therefore, the supply of bidirectional DC-DC converters is expanded to connect a DC grid with an ESS (or battery). In general, the bidirectional DC-DC converter is classified into non-isolated or isolated, depending on isolation. For stability, in most systems, bidirectional isolated (dual active) DC-DC converters are mainly used.

A main method used to improve efficiency in a dual active DC-DC converter is an appropriate modulation algorithm as a software-using method. Such modulation algorithms include a phase-shift modulation or PSM algorithm for using only phase difference between a primary side and a secondary side, a single PWM or SPWM algorithm for using a duty ratio on a primary side or a secondary side and phase difference between the two, and a dual PWM or DPWM algorithm for using a duty ratio on both a primary side and a secondary side and phase difference between the two.

Among them, the method which is the most effective and the easiest to apply is the PSM algorithm, but this has a disadvantage that efficiency decreases when light load and an input-and-output ratio increase. Accordingly, to overcome the disadvantage, modulation algorithms containing additional algorithms such as the SPWM and the DPWM are often used.

In case of the SPWM, it is not a little easier to apply than the DPWM, but it is less efficient than the DPWM at low power levels. The DPWM is more difficult to apply than the SPWM, but it is more efficient at low power levels. To achieve high efficiency in full spectrum, the DPWM and the SPWM, therefore, must be properly used.

Briefly, it could be implemented to use the DPWM if a power value is lower than a certain reference power value, and to use the SPWM if the power value is higher. Even the use of a simple hybrid method improves conversion efficiency rather than that of either the SPWM or the DPWM.

Because the DPWM has a lot of variables, existing hybrid methods mostly pre-obtain values offline and apply them. Such methods show more significant decline in efficiency if the pre-obtained values are not correct than if the values are correct. Accordingly, if input and output voltages and variables of a converter change, such values need to be repetitively obtained again.

DETAILED EXPLANATION OF THE INVENTION

Technical Problem

The object of the present invention is to provide a power conversion method for a DC-DC converter by introducing a model-based power calculation method.

More specifically, the object of the present invention is to provide a power conversion method to which an appropriate modulation algorithm is applicable in real time by comparing power of individual modulation algorithms.

The other object of the present invention is to provide a hybrid power conversion method based on SPWM and DPWM which do not require offline calculations.

Means of Solving the Problem

A power conversion method in accordance with one aspect of the present invention as a method for determining an algorithm of converting power at every control cycle for converting power, and converting the power under the determined algorithm, may comprise steps of: calculating average power of an inductor in a transformer upon power conversion under a SPWM algorithm at the control cycle; calculating average power of an inductor in a transformer upon power conversion under a DPWM algorithm at the control cycle; and converting the power under either of the algorithms of which the calculated average power of the inductor in the transformer is greater.

Herein, at the step of calculating average power of an inductor in a transformer upon power conversion under a DPWM algorithm at the control cycle, the DPWM algorithm with maximum duty in a given step-up or step-down condition at the control cycle may be selected.

Herein, the average power of the inductor of the transformer may be calculated upon power conversion under the SPWM algorithm and the DPWM algorithm by applying a primary-side voltage value and a secondary-side voltage value of the transformer.

Herein, the DPWM algorithm may drive the primary-side voltage of the transformer in square wave to which a primary duty phase is applied, and may drive the secondary-side voltage of the transformer in square wave to which a secondary duty phase is applied.

Herein, upon step-up, the SPWM algorithm may drive the secondary-side voltage of the transformer in square wave, and may drive the primary-side voltage of the transformer in square wave to which a duty phase is applied.

Herein, at the step of calculating average power of an inductor in a transformer upon power conversion under a SPWM algorithm at the control cycle, the average power may be obtained under following equation:

$$I_{s1} = \frac{V_{pri}}{\omega_{sw}L}\left(\frac{-\pi}{2} + g\left(\frac{\pi-\beta}{2}\right)\right)$$

$$I_{s2} = -\frac{V_{pri}}{\omega_{sw}L}\left(\phi - \frac{\pi}{2} + g\frac{\pi-\beta}{2}\right)$$

$$I_{s3} = \frac{V_{pri}}{\omega_{sw}L}\left(\beta - \phi - \frac{\pi}{2} + g\left(\frac{\pi-\beta}{2}\right)\right)$$

-continued $$P_{ave} = V_s I_{ave} = V_s(\pi - \beta)\frac{I_2^2 - I_3^2}{(\text{abs}(I_2) + \text{abs}(I_3))}\frac{1}{\pi}\frac{1}{2}$$

($V_{pri}$: Primary-side voltage, $V_{sec}=V_s$: Secondary-side voltage

Ø: Phase difference between primary-side voltage and secondary-side voltage

α: Duty phase of the primary-side voltage $\omega_{sw}$: Angular velocity at the switching frequency of the switching element g: Input-output voltage ratio on the primary and secondary sides $I_{s1}=I_1$, $I_{s2}=I_2$, $I_{s3}=I_3$ $P_{ave}$: Average power).

Herein, at the step of calculating average power of an inductor in a transformer upon power conversion under a DPWM algorithm at the control cycle, average power may be obtained under following equation:

$$I_{d1} = \frac{V_{pri}}{\omega_{sw}L}\left(\frac{\alpha - \pi}{2} + g\left(\frac{\pi - \beta}{2}\right)\right)$$

$$I_{d2} = -\frac{V_{pri}}{\omega_{sw}L}\left(\phi + \frac{\alpha - \pi}{2} + g\frac{\pi - \beta}{2}\right)$$

$$I_{d3} = \frac{V_{pri}}{\omega_{sw}L}\left(\beta - \phi - \frac{\alpha + \pi}{2} + g\frac{\pi - \beta}{2}\right)$$

$$P_{ave} = V_s I_{ave} = V_s(\pi - \beta)\frac{I_2^2 - I_3^2}{(\text{abs}(I_2) + \text{abs}(I_3))}\frac{1}{\pi}\frac{1}{2}$$

($V_{pri}$: Primary-side voltage, $V_{sec}=V_s$: Secondary-side voltage

Ø: Phase difference between primary-side voltage and secondary-side voltage

α: Duty phase of the primary-side voltage, β: Duty phase of the secondary-side voltage $\omega_{sw}$: Angular velocity at the switching frequency of the switching element g: Input-output voltage ratio on the primary and secondary sides $I_{d1}=I_1$, $I_{d2}=I_2$, $I_{d3}=I_3$ $P_{ave}$: Average power).

Herein, upon step-down, the SPWM algorithm drives the primary-side voltage of the transformer in square wave, and drives the secondary-side voltage of the transformer in square wave to which the duty phase is applied.

Herein, at the step of calculating average power of an inductor in a transformer upon power conversion under a SPWM algorithm at the control cycle, average power may be obtained under following equation:

$$I_{s1} = \frac{V_{pri}}{\omega_{sw}L}\left(\frac{\alpha - \pi}{2} + g\left(\frac{\pi}{2} + \phi\right)\right)$$

$$I_{s2} = \frac{V_{pri}}{\omega_{sw}L}\left(\frac{\alpha - \pi}{2} + g\frac{\pi}{2}\right)$$

$$I_{s3} = \frac{V_{pri}}{\omega_{sw}L}\left(\frac{-\alpha + \pi}{2} - g\left(\frac{\pi}{2} - \alpha - \phi\right)\right)$$

$$P_{ave} = V_p I_{ave} = V_p(\pi - \alpha)\frac{I_3^2 - I_1^2}{(\text{abs}(I_3) + \text{abs}(I_1))}\frac{1}{\pi}\frac{1}{2}$$

($V_{pri}=V_p$: Primary-side voltage, $V_{sec}$: Secondary-side voltage

Ø: Phase difference between primary-side voltage and secondary-side voltage

α: Duty phase of the primary-side voltage $\omega_{sw}$: Angular velocity at the switching frequency of the switching element g: Input-output voltage ratio on the primary and secondary sides $I_{s1}=I_1$, $I_{s2}=I_2$, $I_{s3}=I_3$ $P_{ave}$: Average power).

Herein, at the step of calculating average power of an inductor in a transformer upon power conversion under a DPWM algorithm at the control cycle, average power may be obtained under following equation:

$$I_{d1} = \frac{V_{pri}}{\omega_{sw}L}\left(\frac{\alpha - \pi}{2} + g\left(\frac{\pi - \beta}{2} + \phi\right)\right)$$

$$I_{d2} = \frac{V_{pri}}{\omega_{sw}L}\left(\frac{\alpha - \pi}{2} + g\frac{\pi - \beta}{2}\right)$$

$$I_{d3} = \frac{V_{pri}}{\omega_{sw}L}\left(\frac{-\alpha + \pi}{2} - g\left(\frac{\pi + \beta}{2} - \alpha - \phi\right)\right)$$

$$P_{ave} = V_p I_{ave} = V_p(\pi - \alpha)\frac{I_3^2 - I_1^2}{(\text{abs}(I_3) + \text{abs}(I_1))}\frac{1}{\pi}\frac{1}{2}$$

($V_{pri}=V_p$: Primary-side voltage, $V_{sec}$: Secondary-side voltage

Ø: Phase difference between primary-side voltage and secondary-side voltage

α: Duty phase of the primary-side voltage, β: Duty phase of the secondary-side voltage $\omega_{sw}$: Angular velocity at the switching frequency of the switching element g: Input-output voltage ratio on the primary and secondary sides $I_{d1}=I_1$, $I_{d2}=I_2$, $I_{d3}=I_3$ $P_{ave}$: Average power).

Herein, it may further include a step of confirming soft switching, if the DPWM algorithm is selected.

Herein, the step of confirming the soft switching may be performed in an algorithm of inspecting whether $I_{d1}$, $I_{d2}$, and $I_{d3}$ have corresponding signs under the equation.

Effects of the Invention

The implementation of a power conversion method in accordance with the present invention of the aforementioned configuration has an effect of being capable of increasing efficiency of power conversion for a DC-DC converter.

More specifically, the power conversion method in accordance with the present invention has an effect of selecting a more appropriate optimal modulation algorithm to improve efficiency by calculating power at every control cycle based on a modulation algorithm model.

The power conversion method in accordance with the present invention has an effect of increasing reliability of a DC-DC converter, and lowering radiation burden because it improves efficiency at low power levels rather than a SPWM algorithm.

The power conversion method in accordance with the present invention has an effect of not requiring to perform repetitive calculations offline upon development of a new product because values are determined online every time.

DETAILED DESCRIPTION OF THE PREFERRED EMBODIMENTS

Detailed example embodiments to implement the present invention will be explained below by referring to attached drawings.

Upon the explanation of the present invention, terms such as "a first," "a second," etc. may be used to explain a variety of components but the components may not be limited by such terms. The terms are used only for the purpose of distinguishing one component from another. For example, a first component may be named as a second component without being beyond the scope of the right of the present invention and similarly, even a second component may be named as a first one.

If it is mentioned that a component is connected or linked to another component, it may be understood that the component may be directly connected or linked to the another component but also a third component may exist in between them.

The terms used in this specification are used only to explain specific example embodiments and they are not intended to limit the present invention. Unless a context clearly indicates a different meaning, any reference to singular may include plural ones.

In this specification, terms such as include or equip are used to indicate that there are features, numbers, steps, operations, components, parts or combinations thereof, and it can be understood that existence or one or more different features, numbers, steps, operations, components, parts or combinations thereof are not precluded.

Besides, for clearer explanation, shapes, sizes, etc. of elements in drawings may be exaggerated.

Figure 1:
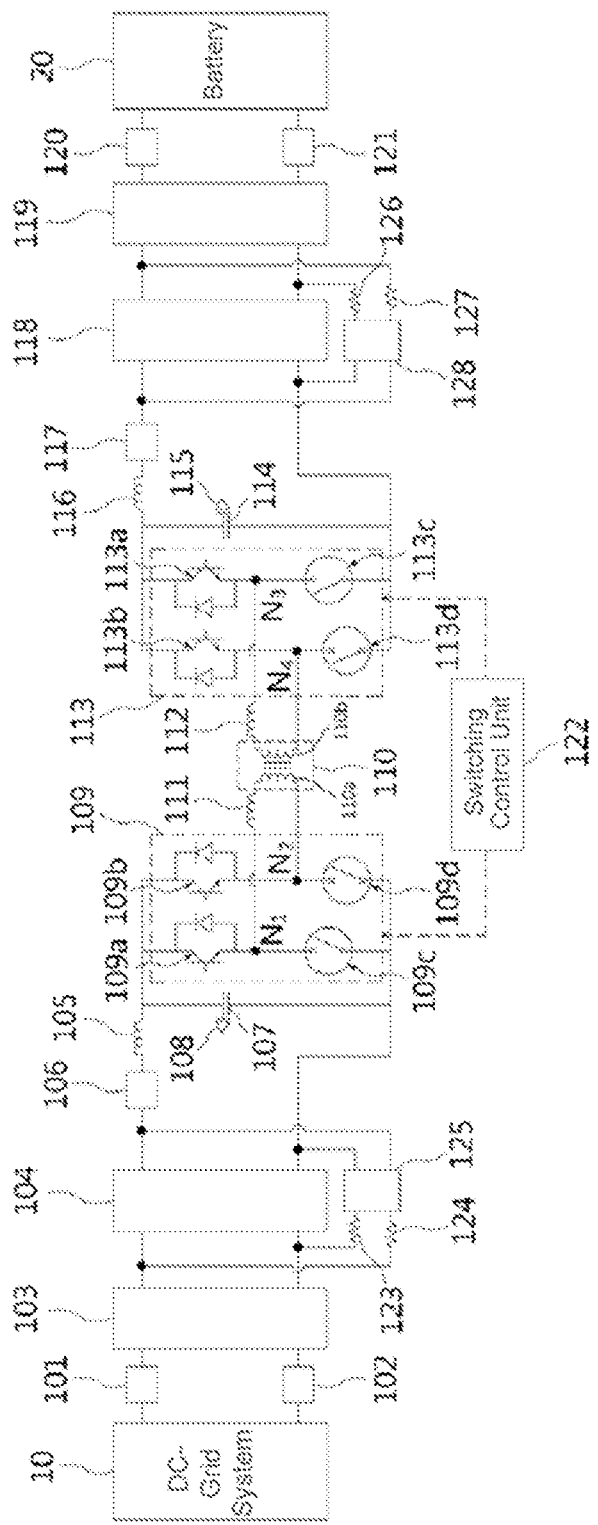
FIG. 1 is a block diagram of a DC-DC converter capable of performing a power conversion method in accordance with the thought of the present invention.

FIG. 1 is a block diagram of a DC-DC converter capable of performing a power conversion method in accordance with the thought of the present invention. The illustrated DC-DC converter is a bidirectional isolated converter, but the power conversion method of the present invention may be also applied to different types of DC-DC converters.

By referring to FIG. 1, a bidirectional isolated DC-DC converter 100 in accordance with the present invention controls bidirectional current flow through switching between a DC-grid system 10 and a battery 20. It is basically composed of a first molded case circuit breaker (MCCB) unit 104 for blocking a power line connected to the DC-grid system 10 upon occurrence of failure, a first power line blocking unit 125 for blocking power line according to an operation by being connected in parallel with the first MCCB unit 104, a first capacitor 107 for charging voltage supplied to the DC-grid system 10, a first switching unit 109 for being connected in parallel with the first capacitor 107 and being configured with multiple switches 109A-109D in a form of full bridge, a transformer 110 connected with an output terminal of the first switching unit 109 through a primary-side coil, a second switching unit 113 for being connected in parallel with a secondary-side output terminal of the transformer 110 and being configured with multiple switches 113A-1139D in a form of full bridge, a second capacitor 114 for charging a battery 20 by storing output voltage of the second switching unit 113, a switching control unit 122 for controlling switching of first and second switching units 109 and 113, a second MCCB unit 118 for blocking a power line connected to the battery 20 upon occurrence of failure, and a second power line blocking unit 128 for blocking power line according to an operation by being connected in parallel with the second MCCB unit 118.

When the DC-grid system 10 supplies voltage to the battery 20 or the voltage stored in the battery 20 is supplied to the DC-grid system 10, the bidirectional isolated DC-DC converter 100 performs the bidirectional DC-DC voltage conversion between the DC-grid system 10 and the battery 20.

While the DC-grid system 10 supplies power to load, not illustrated, connected with itself, if heavy load is connected, the DC-grid system 10 bears the heavy load by receiving energy stored in the battery 20, and conversely store remaining energy in the battery 20 upon light load. In addition, if remaining charging voltage of the battery 20 falls below a preset reference value, a mode of the battery 20 is converted to a charging mode to make the DC-grid system 10 supply voltage to the battery 20 to be charged.

At the time, the DC-grid system 10 intends to increase efficiency of the bidirectional DC-DC converter 100 by controlling first and second switching units through a variety of switching controls depending on load size connected at a charging mode of the battery 20 to which voltage is supplied by the DC-grid system 10 or at a discharging mode of the battery 20 which supplies voltage to the DC-grid system 10.

The first capacitor 107 is connected in parallel with the DC-grid system 10 to charge voltage outputted from the DC-grid system 10 or charge the voltage to supply to the DC-grid system 10.

The first MCCB unit 104 protects devices and circuits by blocking a power line upon short circuit or overload to prevent fire, accident, etc. that may occur due to the short circuit or overload. In addition, the first MCCB unit 104 turns on to make the voltage outputted from the DC-grid system 10 charged to the capacitor 107.

The first power line blocking unit 125 is connected in parallel with the first MCCB unit 104 and blocks a power line, if necessary, by being turned off depending on operation of the DC-DC converter 100. Of course, if it is turned on, it connects the power line to make power supplied from the DC-grid system 10.

The plus (+) end of the first MCCB unit 104 is connected in parallel with a first charge resistance 123 and the minus (−) end thereof is connected in parallel with a second charge resistance 124. The first power line blocking unit 125 is connected in series with the first and second charge resistances 123 and 124.

The first switching unit 109 includes a first switch 109A, a second switch 109B, a third switch 109C, and a fourth switch 109D connected in a full bridge form. At the time, a contact point of the first switch 109A and the second switch 109B is connected to one side of the first capacitor 107, and a contact point of the third switch 109C and the fourth switch 109D is connected to the other end of the first capacitor 107. The first to fourth switches 109A to 109D may be implemented as switches of MOSFETs or IGBTs.

The transformer 110 delivers voltage from a primary side to a secondary side, or from the secondary side to the primary side. One side of a primary-side coil 110A is connected to a contact point N1 between the first switch 109A and the third switch 109C, and the other side of the primary-side coil 110A is connected to a contact point N2 between the second switch 109B and the fourth switch 109D.

The second switching unit 113 includes a fifth switch 113A, a sixth switch 113B, a seventh switch 113C, and an eighth switch 113D connected in a full bridge form. At the time, a contact point N3 of the fifth switch 113A and the seventh switch 113C is connected to one side of a secondary-side coil 110B of the transformer 110, and a contact point N4 between the sixth switch 113B and the eighth switch 113D is connected to the other side of the secondary-side coil 110B of the transformer 110. The fifth to eighth switches 113A to 113D may be implemented as switches of MOSFETs or IGBTs.

One side of the second capacitor 114 is connected to a contact point between the fifth switch 113A and the sixth switch 113B, and the other side thereof is connected to a contact point between the seventh switch 113C and the eighth switch 113D. The voltage stored in the second capacitor 114 is charged to the battery 20.

The second MCCB unit 118 protects devices and circuits by blocking a power line upon short circuit or overload to prevent fire, accident, etc. that may occur due to the short circuit or overload. In addition, the second MCCB unit 118 turns on to make the voltage charged to the second capacitor 114 charge the battery 20 or make the voltage of the battery 20 charged to the second capacitor 114.

The second power line blocking unit 128 is connected in parallel with the second MCCB unit 118 and blocks a power line, if necessary, by being turned off depending on operation of the DC-DC converter 100. Of course, if it is turned on, it connects the power line to make power supplied to the battery 20 or make voltage discharged from the battery 20.

The plus (+) end of the second MCCB unit 118 is connected in parallel with a third charge resistance 126 and the minus (−) end thereof is connected in parallel with a fourth charge resistance 127. The second power line blocking unit 128 is connected in series with the third and fourth charge resistances 126 and 127.

Meanwhile, depending on implementation, the bidirectional isolated DC-DC converter 100 may further include a first fuse 101, a second fuse 102, a first EMC filter 103, a first inductor 105, a first current detecting unit 106, and a first voltage detecting unit 108 between the DC-grid system 10 and the first capacitor 107, and a second voltage detecting unit 115, a second inductor 116, a second current detecting unit 117, a second EMC filter 119, a third fuse 120 and a fourth fuse 121 between the second capacitor 114 and the battery 20.

The first fuse 101 and the second fuse 102 are installed respectively to individual power lines connected to the plus end and the minus end of the DC-grid system 10, and if a current exceeding a preset reference current flows to one power line, the corresponding fuse opens the power line. The DC-grid system 10 supplies DC voltage to a connected load, not illustrated, or voltage even to the battery 20 to be charged.

The first EMC filter 103, which is connected in parallel with the DC-grid system 10, protects electromagnetic or noise signals sent off from peripheral devices from deteriorating performance of other devices or elements, and at the same time, removes electromagnetic or noise signals sent off from other peripheral devices to protect against impacts over electromagnetic waves to provide normal performance.

The first inductor 105 is connected in series to the first fuse 101, and used to control current provided from the DC-grid system 10.

The first current detecting unit 106 detects a current flowing through the first inductor 105. The first current detecting unit 106 may use a current transformer.

The first voltage detecting unit 108 detects voltage charged to the first capacitor 107. The first voltage detecting unit 108 may use a potential transformer.

One side of a first auxiliary inductor 111 is connected to the contact point N1, and the other side thereof is connected to the primary-side coil 110A of the transformer 110. One side of a second auxiliary inductor 112 is connected in series to one side of the secondary-side coil 110B of the transformer 110 and the other side thereof is connected to the second switching unit 113.

The second voltage detecting unit 115 detects voltage stored in the second capacitor 114. The second voltage detecting unit 115, for example, may be implemented as a potential transformer.

One side of the second inductor 116 is connected to a contact point between the fifth switch 113A and the sixth switch 113B, and the other side thereof is connected to the second MCCB unit 118 in the lower part.

The second current detecting unit 117 detects a current flowing through the second inductor 116. The second current detecting unit 117 may be implemented as a current transformer.

The second EMC filter 119 is connected in parallel with the second MCCB unit 118, and just like the first EMC filter 103, it protects electromagnetic or noise signals sent off from various devices generating electromagnetic waves from deteriorating performance of other devices or elements, and at the same time, removes electromagnetic or noise signals sent off from other devices to protect against impacts over electromagnetic waves to provide normal performance.

The third fuse 120 and the fourth fuse 121 are installed respectively to individual power lines connected to the plus end and the minus end of the battery 20, and if a current exceeding a preset reference current flows to one power line, the corresponding fuse opens the power line.

In accordance with the present invention, the switching control unit 122 of the bidirectional isolated DC-DC converter 100 controls switching of the first to the fourth switches 109A to 109D of the first switching unit 109, and the fifth to eighth switches 113A to 113D of the second switching unit 113 independently to control bidirectional power flow between the DC-grid system 10 and the battery 20.

Switching control is made by the switching control unit 122 depending on size of voltage of the DC-grid system 10, i.e., charging voltage charged to the first capacitor 107 and voltage of the battery 20, i.e., charging voltage charged to the second capacitor 114 by using PSM switching control, SPWM switching control, and DPWM switching control.

In short, PSM switching control, SPWM switching control, and DPWM switching control are used depending on difference between the detected voltage of the DC-grid system 10 and the detected voltage of the battery 20 upon charging or discharging of the battery 20.

Figure 2:
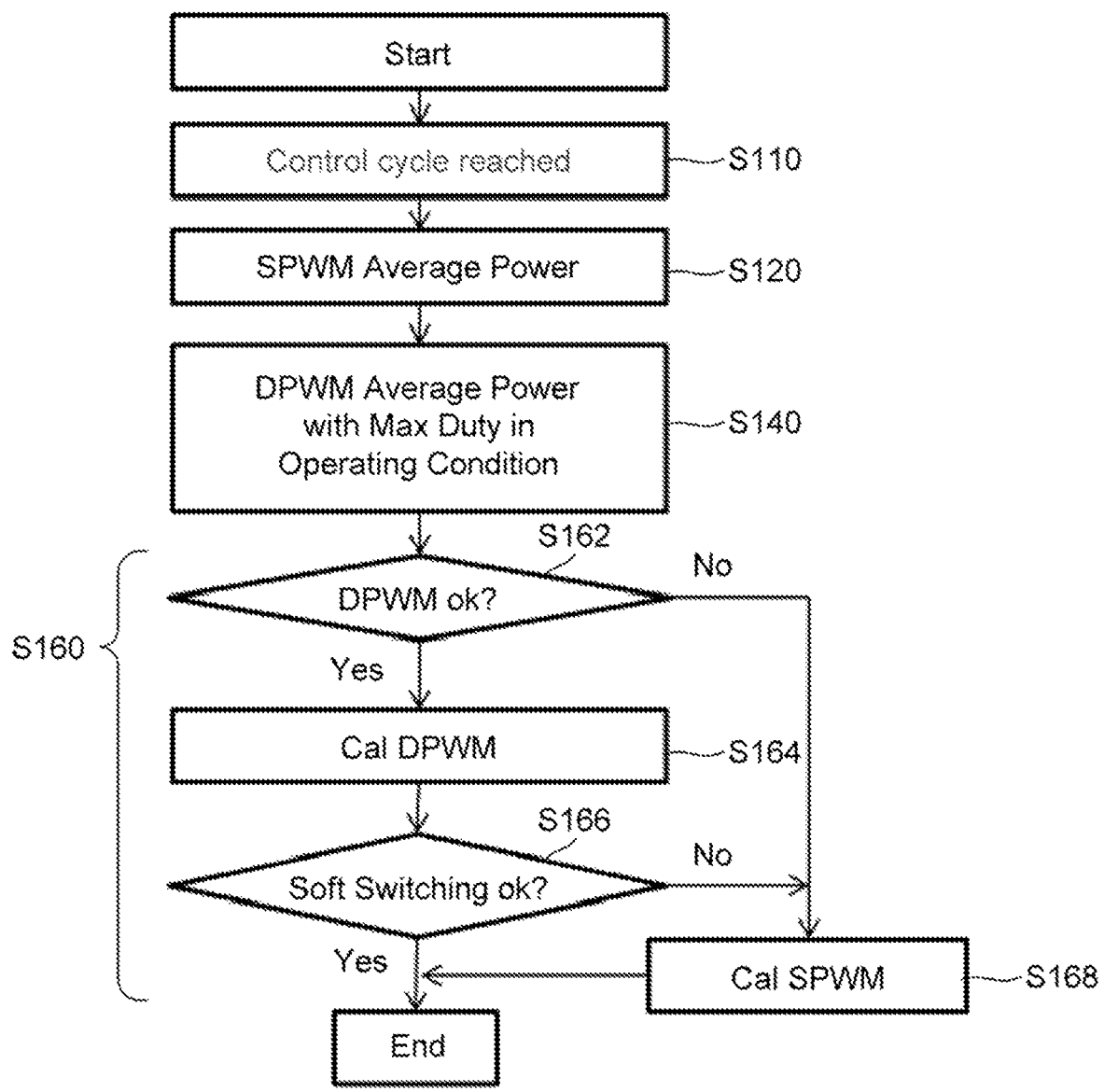
FIG. 2 is a flowchart illustrating a power conversion method in accordance with the thought of the present invention.

FIG. 2 is a flowchart illustrating a power conversion method in accordance with the thought of the present invention.

The illustrated power conversion method, as a method for determining an algorithm of converting power at every control cycle for converting power and converting the power under the determined algorithm, may be performed in center of a switching control unit 122 in FIG. 1.

The power conversion method may comprise steps of: calculating average power of an inductor in a transformer upon power conversion under a SPWM algorithm at the control cycle at S120; calculating average power of an inductor in a transformer upon power conversion under a DPWM algorithm at the control cycle at S140; and converting the power under either of the algorithms of which the calculated average power of the inductor in the transformer is greater at S160.

In the present invention, a duty means a temporal cycle which keeps zero (0) while a square wave alternating a positive domain and a negative domain is moving, and a duty phase means the cycle of a phase of the square wave during the duty cycle.

In the present invention, the SPWM algorithm means an algorithm of driving a secondary-side voltage of the transformer in square wave and a primary-side voltage of the transformer to which a duty phase is applied in square wave upon step-up, and driving a primary-side voltage of the transformer in square wave and driving a secondary-side voltage of the transformer to which a duty phase is applied in square wave, upon step-down. Herein, driving the primary side and the secondary side of the transformer means operating switching elements connected to the primary-side coil and the secondary-side coil, respectively.

In the present invention, the DPWM algorithm means an algorithm of driving the primary-side voltage of the transformer in square wave to which a primary (delay) duty phase is applied, and driving the secondary-side voltage of the transformer in square wave to which a secondary duty phase is applied. Herein, driving the primary side and the secondary side of the transformer means operating switching elements connected to the primary-side coil and the secondary-side coil, respectively.

In the DPWM algorithm, upon step-up, a secondary duty (and a secondary duty phase) is larger than a primary duty (and a primary duty phase), and upon step-down, the secondary duty (and the secondary duty phase) is smaller than the primary duty (and the primary duty phase).

In the DPWM algorithm, the smaller of the primary duty and the secondary duty is called a second duty, and the larger thereof is called a first duty.

As described above, at the illustrated steps of S120 and S140, it can be found out that the average power is calculated at the inductor of the transformer when the power is converted using the SPWM algorithm and the DPWM algorithm by applying the primary-side voltage value and the secondary-side voltage value of the transformer.

At the step S120 of calculating the average power of the inductor upon the power conversion using the SPWM algorithm as illustrated, only one fixed power value is needed to be calculated, but at the step S140 of calculating the average power of the inductor upon the power conversion using the DPWM algorithm as illustrated, among the average power values obtained from various combinations of the primary and the secondary duties, the most appropriate value is required to be selected.

In other words, at the step S140 of calculating the average power of the inductor upon the power conversion using the DPWM algorithm, the DPWM algorithm with the maximum duty upon step-up or step-down given to a control cycle is selected. More specifically, during the computation course, the DPWM algorithm with the second duty as the maximum duty.

At the step S160 of converting the power, the calculated average power of the inductor under the SPWM algorithm at S120 and the calculated and selected average power under the DPWM algorithm which uses combinations of the primary and the secondary duties at S140 are compared at S162. As the result of the comparison, power conversion operation at the control cycle with the large average power is performed at S164 and S168. If the DPWM algorithm is selected at S164, the power conversion operation is performed at the control cycle under the DPWM algorithm which uses combinations of the primary and the secondary duties selected at the S140. In the drawing, if the DPWM algorithm is selected, and control is made under the selected algorithm, whether soft switching is conducted is examined at S166. But at the step S140, when a combination with the longest of various combinations of the primary and the secondary duties is selected, soft switching of the combinations of the primary and the secondary duties may be examined, and in this case, the step S166 may be omitted.

Figure 3:
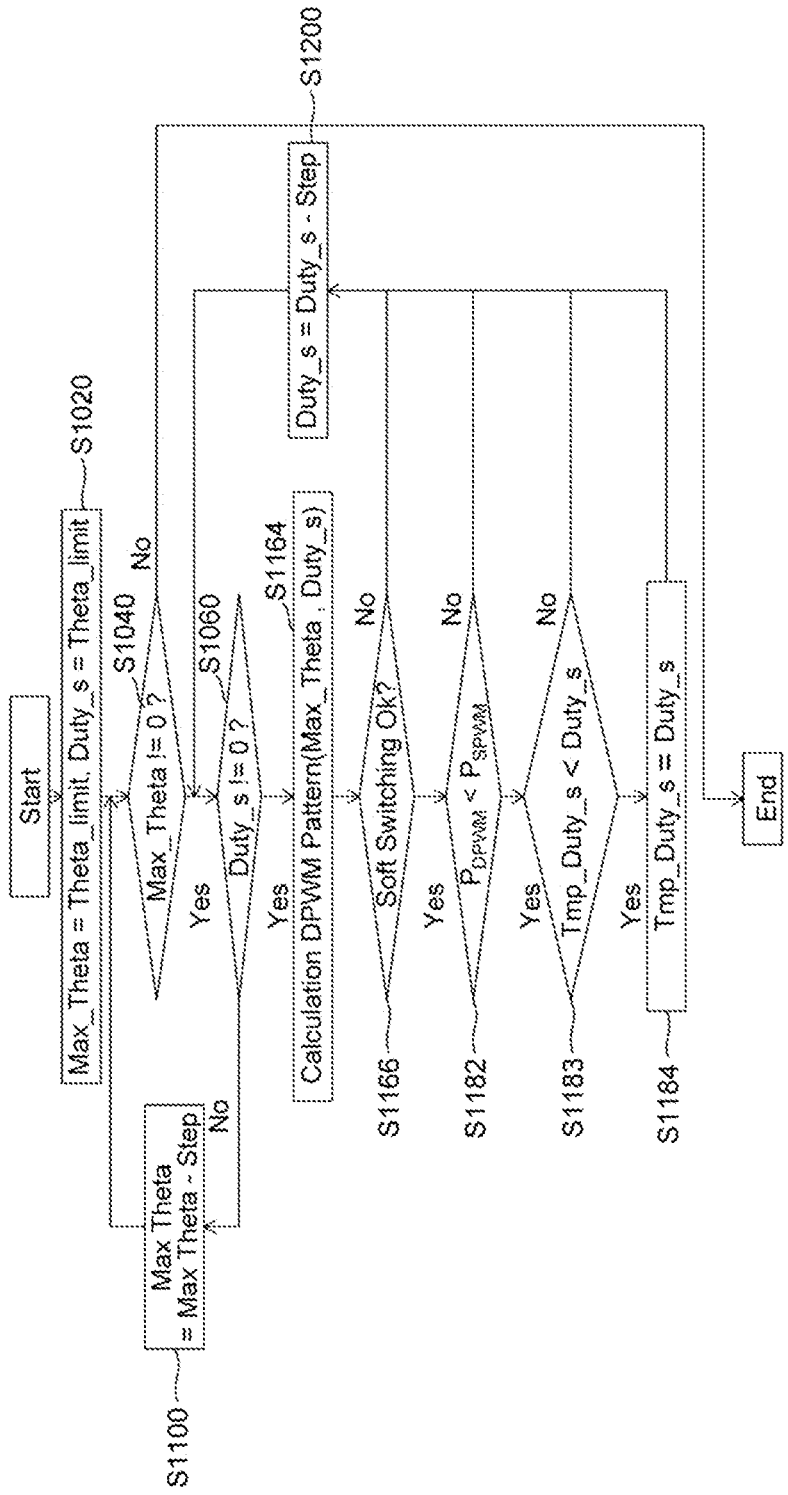
FIG. 3 is a flowchart illustrating a power conversion method in center of a process of selecting an optimal combination of a primary duty and a secondary duty in accordance with the thought of the present invention.

FIG. 3 is a flowchart illustrating a power conversion method in center of a process of selecting an optimal combination of a primary duty and a secondary duty in accordance with the thought of the present invention. The course of selecting optimal combination of the first and the second duties is an example, and of course, the same thought may be implemented even in another method.

In the drawing, Max_Theta is a variable related to the first duty as specified above, and Duty_S is a variable related to the second duty as specified above.

Figure 4:
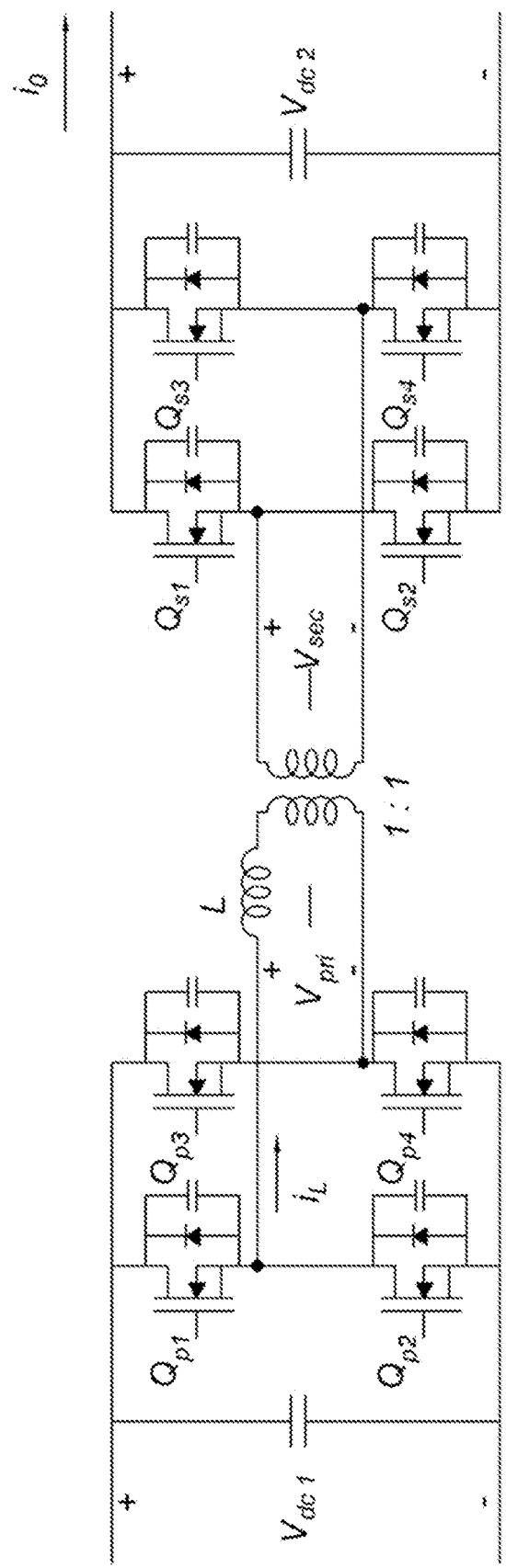
FIG. 4 is a circuit diagram in center of a transformer and switching elements with an isolating DC-DC converter in FIG. 1.

FIG. 4 is a circuit diagram in center of a transformer and switching elements with an isolating DC-DC converter in FIG. 1. In the illustrated circuit diagram of FIG. 4, the second auxiliary inductor 112 is omitted, and more specific implementation is expressed on condition that the ratio of the number of turns on the primary side of the transformer and turns on its secondary is 1:1.

Figure 5A:
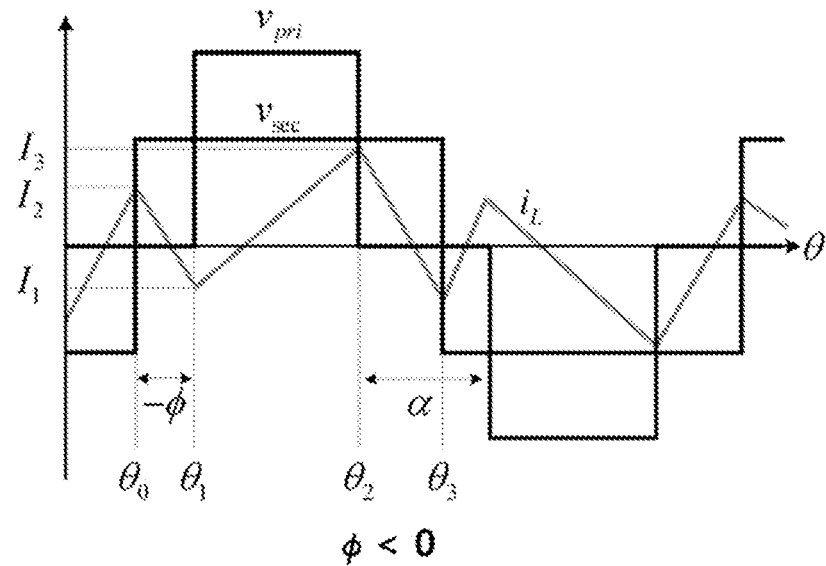
FIGS. 5A and 5B are waveform charts illustrating currents flowing in an inductor of a transformer that drives primary-side and secondary-side coils of a transformer under a SPMW algorithm and a DPWM algorithm upon step-down.
Figure 5B:
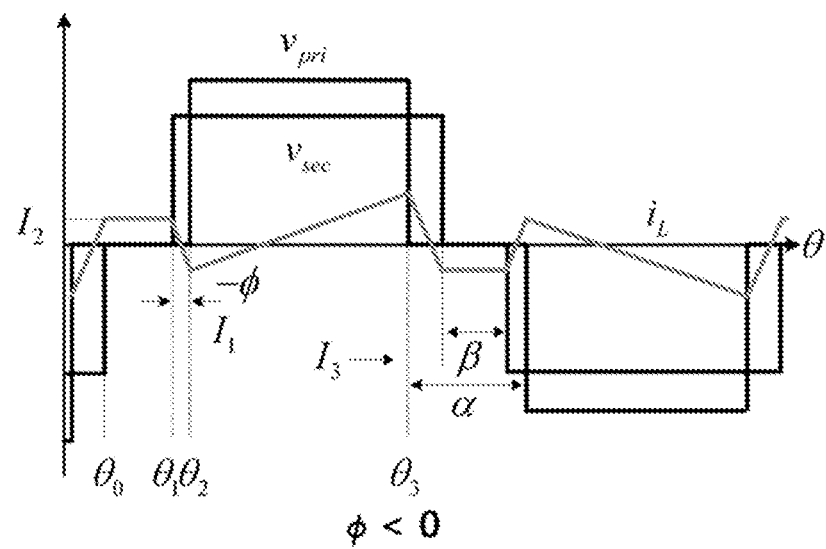

Regarding circuit composition of FIG. 4, upon applying the power conversion method in accordance with the thought of the present invention illustrated in FIG. 2, FIGS. 5A and 5B illustrate currents flowing in an inductor of a transformer that drives primary-side and secondary-side coils of a transformer under the SPMW algorithm and the DPWM algorithm upon step-down.

As illustrated, upon step-down, switching elements on both ends of the transformer are controlled to have a wider waveform while the voltage of the second coil is lower than that of the first coil under both the SPMW and the DPWM algorithms.

Upon step-down, under the SPWM algorithm, it was assumed that the current value of the inductor at rising time $\theta_0$ of a secondary-side voltage waveform without any duty is called $I_2$, the current value of the inductor at rising time $\theta_1$ after a duty of a primary-side voltage waveform $I_1$, and the current value of the inductor at falling time $\theta_2$ of the primary-side voltage waveform $I_3$. The falling time $\theta_3$ of the secondary-side voltage waveform was also illustrated.

As illustrated, the current of the inductor may be modeled in a triangle wave with the current values $I_1$, $I_2$ and $I_3$ as vertices. In case of the SPWM algorithm, a specific equation for calculating current values $I_1$, $I_2$ and $I_3$ is as shown in Equation 1 below.

$$I_{s1} = \frac{V_{pri}}{\omega_{sw}L}\left(\frac{\alpha-\pi}{2} + g\left(\frac{\pi}{2}+\phi\right)\right)$$ [Equation 1]

$$I_{s2} = \frac{V_{pri}}{\omega_{sw}L}\left(\frac{\alpha-\pi}{2} + g\frac{\pi}{2}\right)$$

$$I_{s3} = \frac{V_{pri}}{\omega_{sw}L}\left(\frac{-\alpha+\pi}{2} - g\left(\frac{\pi}{2}-\alpha-\phi\right)\right)$$

In the aforementioned equation, $V_{pri}$ is primary-side voltage, $V_{sec}$ is secondary-side voltage, and Ø is phase difference between primary-side voltage and secondary-side voltage. $V_{pri}$ may be briefly expressed as $V_p$.

In the aforementioned equation, α is duty phase of the primary-side voltage, $\omega_{sw}$ is angular velocity at the switching frequency of the switching element, and g is input-output voltage ratio on the primary and secondary sides.

In the aforementioned signs $I_{s1}$, $I_{s2}$ and $I_{s3}$, s is used to emphasize SPWM.

They may be simply expressed as $I_1$, $I_2$ and $I_3$.

The detailed equation for calculating average power $P_{ave}$ in the inductor upon power conversion under the SPWM algorithm by using the current values $I_1$, $I_2$ and $I_3$ is as shown in Equation 2 below.

$$P_{ave} = V_p I_{ave} = V_p(\pi-\alpha)\frac{I_3^2 - I_1^2}{(\text{abs}(I_3) + \text{abs}(I_1))}\frac{1}{\pi}\frac{1}{2}$$ [Equation 2]

Upon step-down, under the DPWM algorithm, it was assumed that the current value of the inductor at rising time $\theta_0$ before a duty of a secondary-side voltage waveform is called $I_2$, the current value of the inductor at rising time $\theta_1$ after a duty of a primary-side voltage waveform $I_1$, and the current value of the inductor at falling time $\theta_2$ of the primary-side voltage waveform $I_3$. $I_2$ is maintained until the rising time $\theta_1$ after the duty of the secondary-side voltage waveform.

As illustrated, the current of the inductor may be modeled in a combination of square and triangle waves with the current values $I_1$, $I_2$ and $I_3$ as vertices. In case of the DPWM algorithm, a specific equation for calculating current values $I_1$, $I_2$ and $I_3$ is as shown in Equation 3 below.

$$I_{d1} = \frac{V_{pri}}{\omega_{sw}L}\left(\frac{\alpha-\pi}{2} + g\left(\frac{\pi-\beta}{2}+\phi\right)\right)$$ [Equation 3]

$$I_{d2} = \frac{V_{pri}}{\omega_{sw}L}\left(\frac{\alpha-\pi}{2} + g\frac{\pi-\beta}{2}\right)$$

$$I_{d3} = \frac{V_{pri}}{\omega_{sw}L}\left(\frac{-\alpha+\pi}{2} - g\left(\frac{\pi+\beta}{2}-\alpha-\phi\right)\right)$$

In the aforementioned equation, $V_{pri}$ is primary-side voltage, $V_{sec}$ is secondary-side voltage, and Ø is phase difference between primary-side voltage and secondary-side voltage.

In the aforementioned equation, α is duty phase of the primary-side voltage, β is duty phase of the secondary-side voltage, $\omega_{sw}$ is angular velocity at the switching frequency of the switching element, and g is input-output voltage ratio on the primary and secondary sides.

In the aforementioned signs $I_{d1}$, $I_{d2}$ and $I_{d3}$, d is used to emphasize DPWM. They may be simply expressed as $I_1$, $I_2$ and $I_3$.

The detailed equation for calculating average power $P_{ave}$ in the inductor upon power conversion under the DPWM algorithm by using the current values $I_1$, $I_2$ and $I_3$ is as shown in Equation 4 below.

$$P_{ave} = V_p I_{ave} = V_p (\pi - \alpha) \frac{I_3^2 - I_1^2}{(abs(I_3) + abs(I_1))} \frac{1}{\pi} \frac{1}{2} \qquad \text{[Equation 4]}$$

In FIGS. 2 and/or 3, at the steps S166 and S1166 of examining whether the soft switching is made upon step-down, for example, it could also be rapidly examined in a method of inspecting whether $I_1$, $I_2$ and $I_3$ shown in FIG. 5B have illustrated signs, i.e., checking whether they are plus or minus. Instead of checking the current values as real values, only plus and minus from almost binary values are checked. Therefore, very fast examination is possible.

Figure 6A:
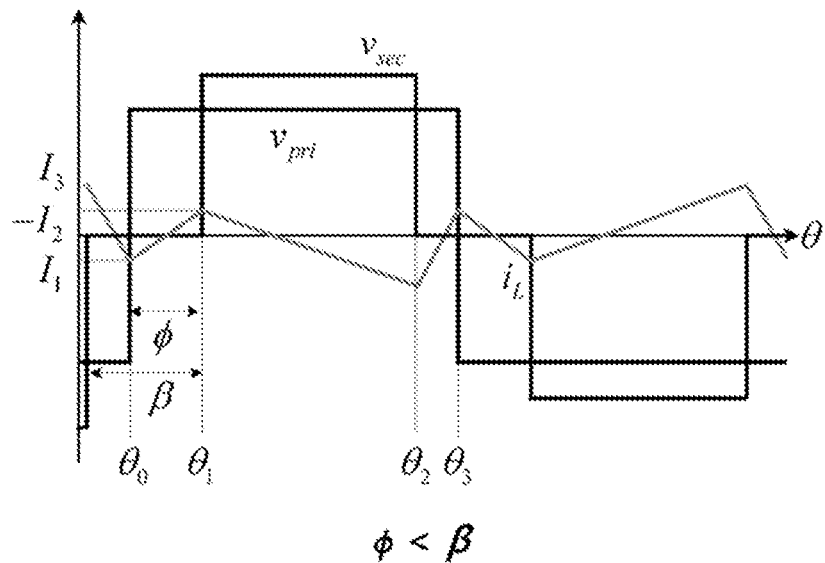
FIGS. 6A and 6B are waveform charts illustrating currents flowing in an inductor of a transformer that drives primary-side and secondary-side coils of a transformer under a SPMW algorithm and a DPWM algorithm upon step-up.
Figure 6B:
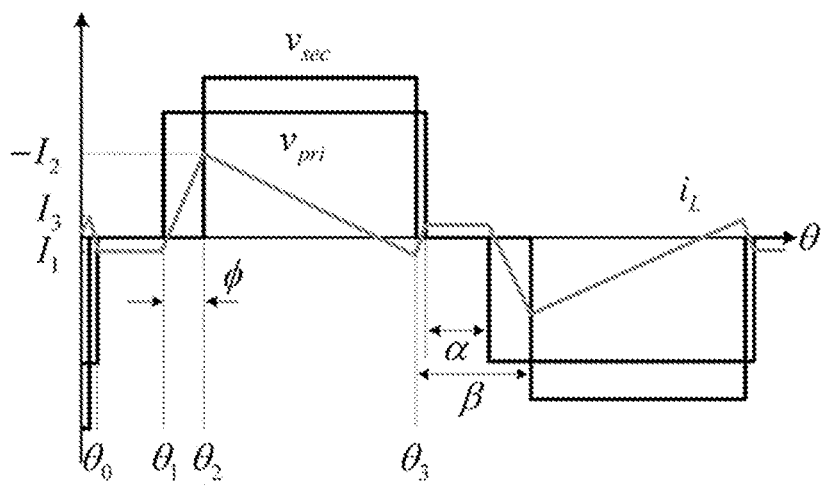

Regarding circuit composition of FIG. 4, upon applying the power conversion method in accordance with the thought of the present invention illustrated in FIG. 2, FIGS. 6A and 6B illustrate currents flowing in an inductor of a transformer that drives primary-side and secondary-side coils of a transformer under the SPMW algorithm and the DPWM algorithm upon step-up.

As illustrated, upon step-up, switching elements on both ends of the transformer are controlled to have a wider waveform while the voltage of the first coil is lower than that of the second coil under both the SPMW and the DPWM algorithms.

Upon step-up, under the SPWM algorithm, it was assumed that the current value of the inductor at rising time $\theta_0$ of a primary-side voltage waveform without any duty is called $I_1$, the current value of the inductor at rising time $\theta_1$ after a duty of a secondary-side voltage waveform $I_2$, and the current value of the inductor at falling time $\theta_2$ of the secondary-side voltage waveform $I_3$. The falling time $\theta_3$ of the primary-side voltage waveform was also illustrated.

As illustrated, the current of the inductor may be modeled in a triangle wave with the current values $I_1$, $I_2$ and $I_3$ as vertices. In case of the SPWM algorithm, a specific equation for calculating current values $I_1$, $I_2$ and $I_3$ is as shown in Equation 5 below.

$$I_{s1} = \frac{V_{pri}}{\omega_{sw} L}\left(\frac{-\pi}{2} + g\left(\frac{\pi - \beta}{2}\right)\right) \qquad \text{[Equation 5]}$$

$$I_{s2} = -\frac{V_{pri}}{\omega_{sw} L}\left(\phi - \frac{\pi}{2} + g\frac{\pi - \beta}{2}\right)$$

$$I_{s3} = \frac{V_{pri}}{\omega_{sw} L}\left(\beta - \phi - \frac{\pi}{2} + g\left(\frac{\pi - \beta}{2}\right)\right)$$

In the aforementioned equation, $V_{pri}$ is primary-side voltage, $V_{sec}$ is secondary-side voltage, and Ø is phase difference between primary-side voltage and secondary-side voltage. $V_{sec}$ may be briefly expressed as $V_s$.

In the aforementioned equation, α is duty phase of the primary-side voltage, $\omega_{sw}$ is angular velocity at the switching frequency of the switching element, and g is input-output voltage ratio on the primary and secondary sides.

In the aforementioned signs $I_{s1}$, $I_{s2}$ and $I_{s3}$, s is used to emphasize SPWM. They may be simply expressed as $I_1$, $I_2$ and $I_3$.

The detailed equation for calculating average power $P_{ave}$ in the inductor upon power conversion under the SPWM algorithm by using the current values $I_1$, $I_2$ and $I_3$ is as shown in Equation 6 below.

$$P_{ave} = V_s I_{ave} = V_s (\pi - \beta) \frac{I_2^2 - I_3^2}{(abs(I_2) + abs(I_3))} \frac{1}{\pi} \frac{1}{2} \qquad \text{[Equation 6]}$$

Upon step-up, under the DPWM algorithm, it was assumed that the current value of the inductor at rising time $\theta_0$ before a duty of a primary-side voltage waveform is called $I_1$, the current value of the inductor at rising time $\theta_2$ after a duty of a secondary-side voltage waveform $I_2$, and the current value of the inductor at falling time $\theta_3$ of the secondary-side voltage waveform $I_3$. $I_1$ is maintained until the rising time $\theta_1$ after the duty of the primary-side voltage waveform.

As illustrated, the current of the inductor may be modeled in a combination of square and triangle waves with the current values $I_1$, $I_2$ and $I_3$ as vertices. In case of the DPWM algorithm upon step-up, a specific equation for calculating current values $I_1$, $I_2$ and $I_3$ is as shown in Equation 7 below.

$$I_{d1} = \frac{V_{pri}}{\omega_{sw} L}\left(\frac{\alpha - \pi}{2} + g\left(\frac{\pi - \beta}{2}\right)\right) \qquad \text{[Equation 7]}$$

$$I_{d2} = -\frac{V_{pri}}{\omega_{sw} L}\left(\phi + \frac{\alpha - \pi}{2} + g\frac{\pi - \beta}{2}\right)$$

$$I_{d3} = \frac{V_{pri}}{\omega_{sw} L}\left(\beta - \phi - \frac{\alpha + \pi}{2} + g\frac{\pi - \beta}{2}\right)$$

In the aforementioned equation, $V_{pri}$ is primary-side voltage, $V_{sec}$ is secondary-side voltage, and Ø is phase difference between primary-side voltage and secondary-side voltage. $V_{sec}$ may be briefly expressed as $V_s$.

In the aforementioned equation, α is duty phase of the primary-side voltage, β is duty phase of the secondary-side voltage, $\omega_{sw}$ is angular velocity at the switching frequency of the switching element, and g is input-output voltage ratio on the primary and secondary sides.

In the aforementioned signs $I_{d1}$, $I_{d2}$ and $I_{d3}$, d is used to emphasize DPWM. They may be simply expressed as $I_1$, $I_2$ and $I_3$.

The detailed equation for calculating average power $P_{ave}$ in the inductor upon power conversion under the DPWM algorithm by using the current values $I_1$, $I_2$ and $I_3$ is as shown in Equation 8 below.

$$P_{ave} = V_s I_{ave} = V_s (\pi - \beta) \frac{I_2^2 - I_3^2}{(abs(I_2) + abs(I_3))} \frac{1}{\pi} \frac{1}{2} \qquad \text{[Equation 8]}$$

In FIGS. 2 and/or 3, at the steps S166 and S1166 of examining whether the soft switching is made upon step-down, for example, it could also be rapidly examined in a method of inspecting whether $I_1$, $I_2$ and $I_3$ shown in FIG. 6B have illustrated signs.

Figure 7A:
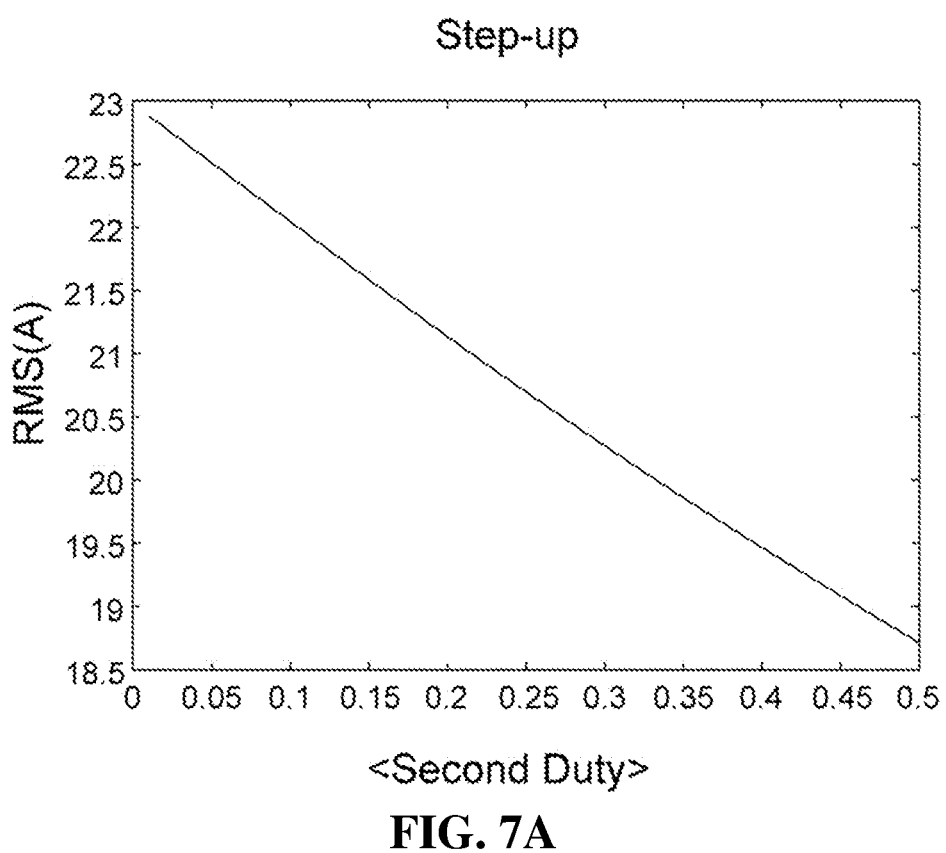
FIGS. 7A and 7B are graphs illustrating relationships between a secondary duty and RMS currents of an inductor if conversion is performed under a DPWM algorithm, respectively, upon step-up and step-down.
Figure 7B:
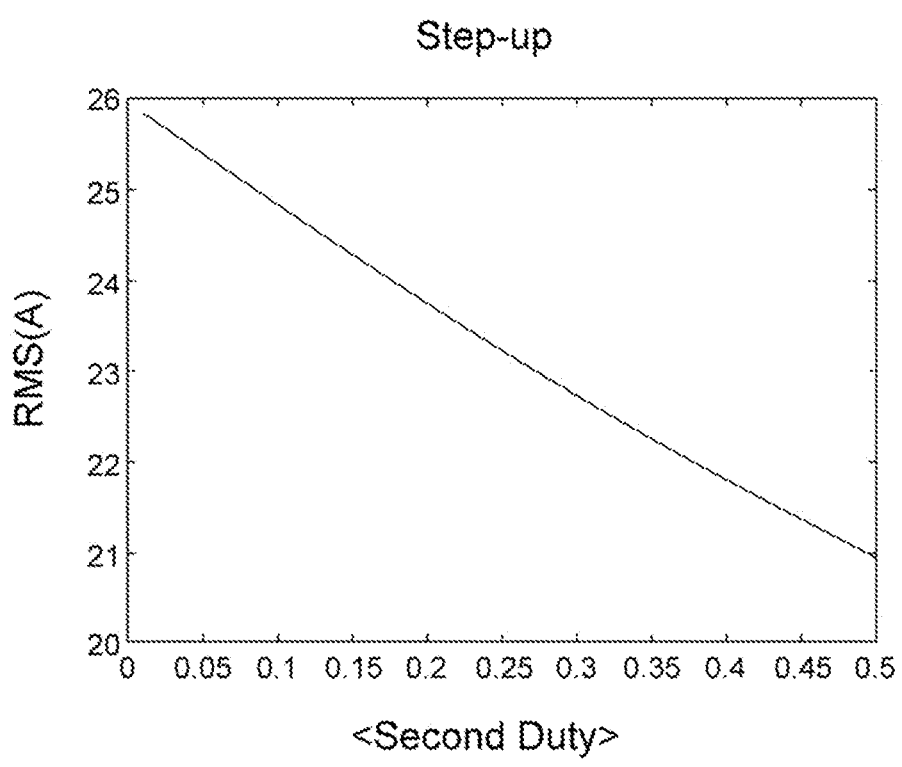

FIGS. 7A and 7B are graphs illustrating relationships between the second duty in the graph and RMS currents of an inductor if conversion is performed under a DPWM algorithm, respectively, upon step-up and step-down. In the graph, it can be found that if the second duty increases at the same power, the RMS value of the current of the inductor is reduced. In other words, if the second duty is larger, the reduction of conduction loss is increased.

Figure 8:
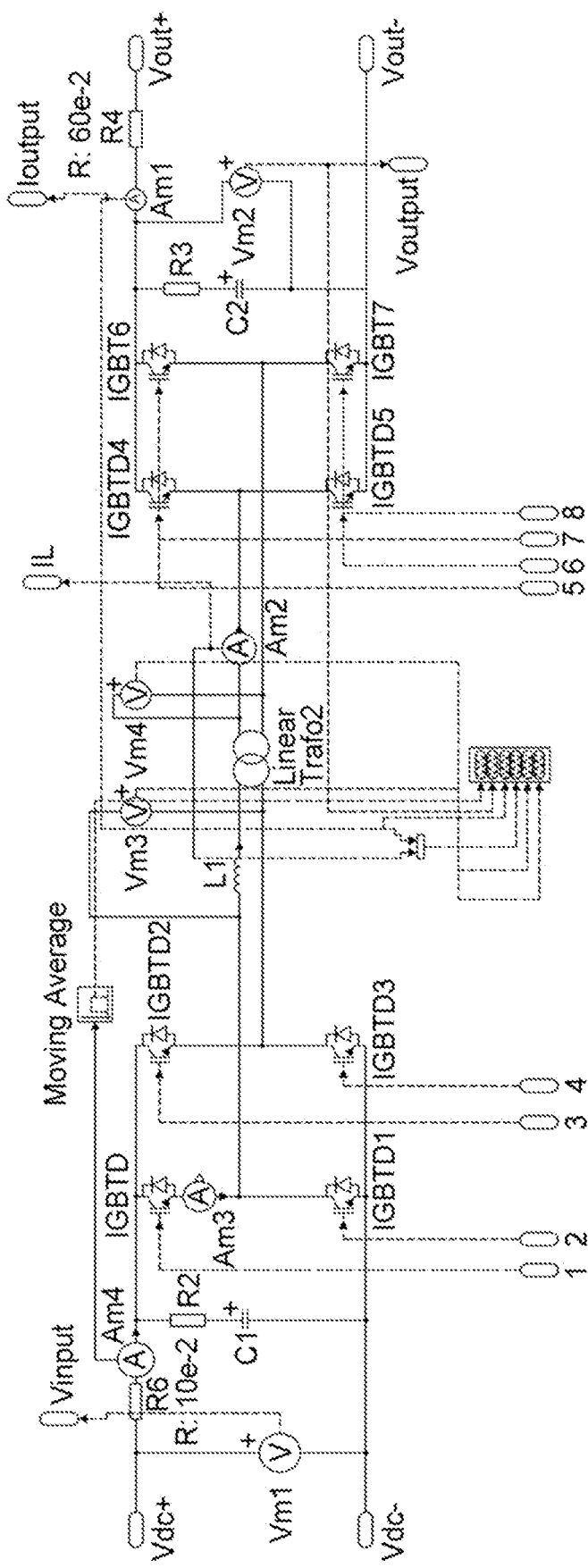
FIG. 8 is a simulation circuit diagram for simulating a power conversion method in accordance with the thought of the present invention.

FIG. 8 is a simulation circuit diagram for simulating a power conversion method in accordance with the thought of the present invention. The illustrated simulation circuit diagram shows simulation in center of the transformer and switching elements which are isolated in FIG. 4.

In the illustrated simulation circuit diagram, simulation is conducted under conditions of input voltage of 700-800V, output voltage of 580-850V, switching frequency of 8 kHz, and the inductance of 110 µH on an auxiliary inductor on an input of a transformer.

Figure 9A:
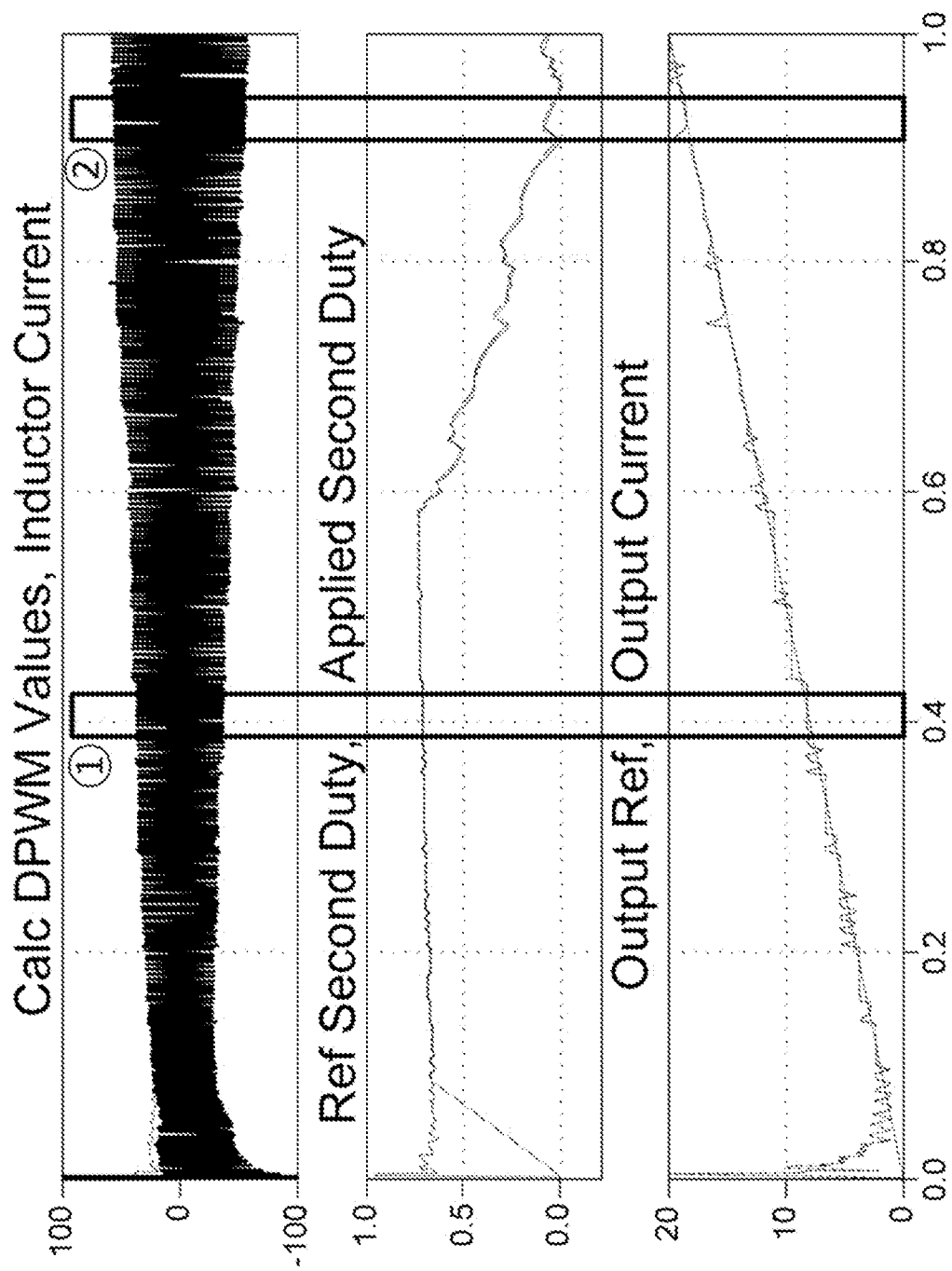
FIG. 9A is graphs representing a simulation result under conditions of input voltage of 700V, output voltage of 820V, and switching frequency of 8 kHz.
Figure 9B:
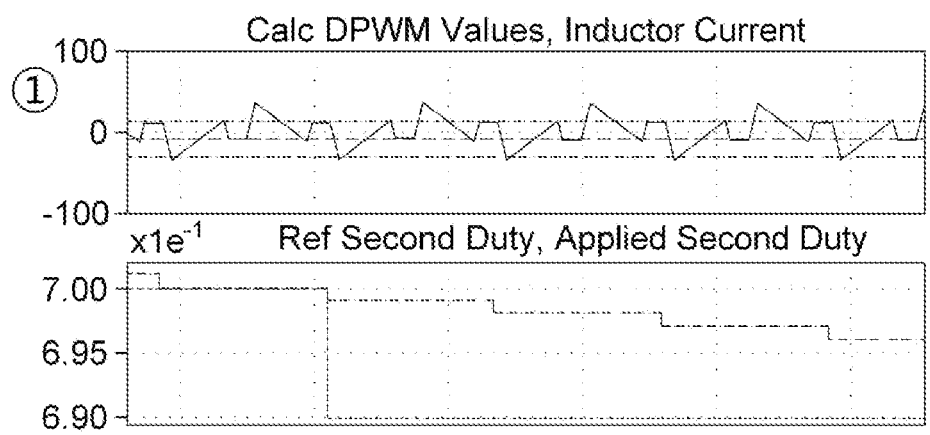
FIG. 9B is graphs magnifying part ① in the graphs in FIG. 9A.
Figure 9C:
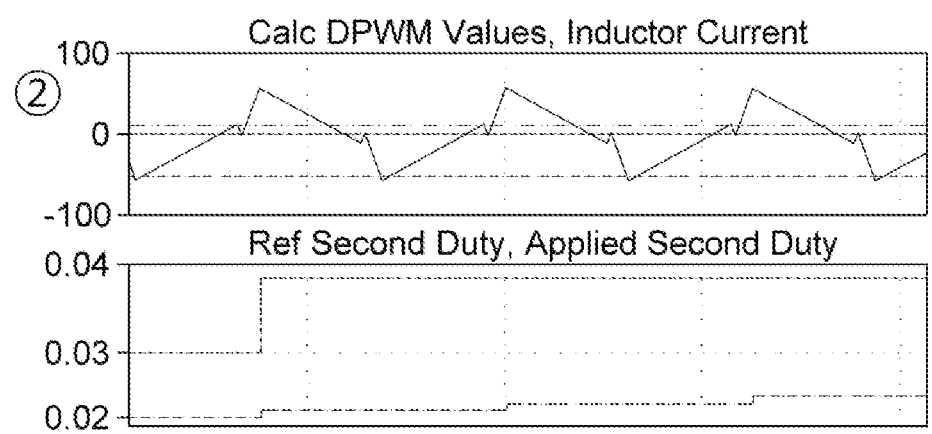
FIG. 9C is graphs magnifying part ② in the graphs in FIG. 9A.

FIG. 9A is graphs representing a simulation result under conditions of input voltage of 700V, output voltage of 820V, and switching frequency of 8 kHz. FIG. 9B is graphs magnifying part ① in the graphs in FIG. 9A, and FIG. 9C is graphs magnifying part ② in the graphs in FIG. 9A. As illustrated, there exists a little ripple but it can be found that the second duty is formed and during the second duty, the output current increases as close as linear wave, and significant current occurs on the auxiliary inductor. More specifically, it can be found out that if the output current continuously increases from 0 to 20, the second duty is accordingly continuously outputted.

Figure 10A:
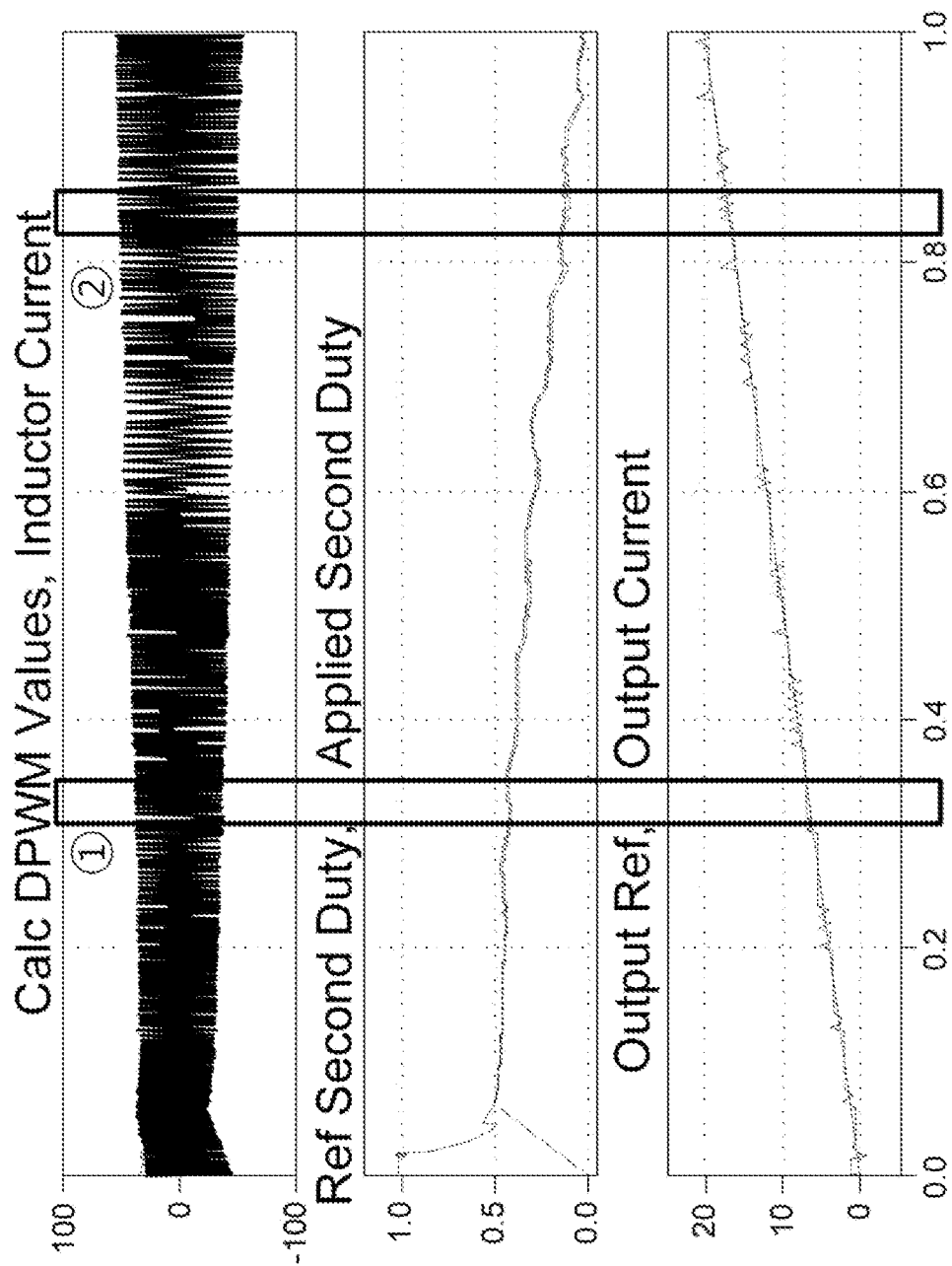
FIG. 10A is graphs representing a simulation result under conditions of input voltage of 750V, output voltage of 6000V, and switching frequency of 8 kHz.
Figure 10B:
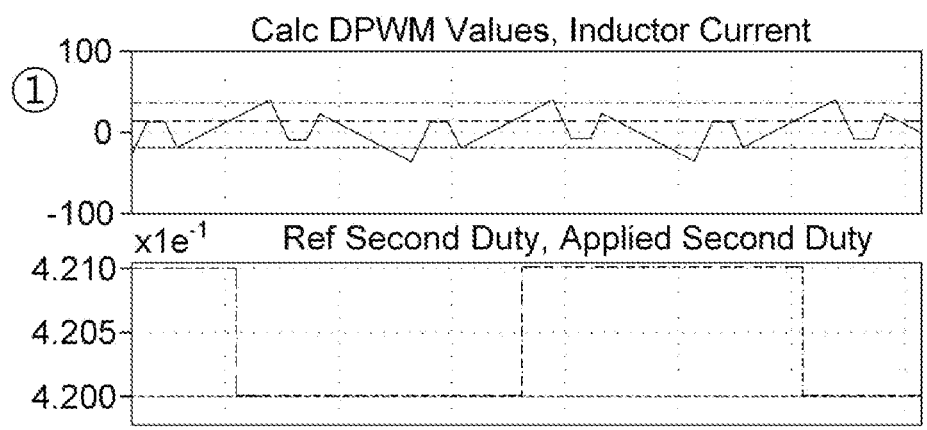
FIG. 10B is graphs magnifying part ① in the graphs in FIG. 10A.
Figure 10C:
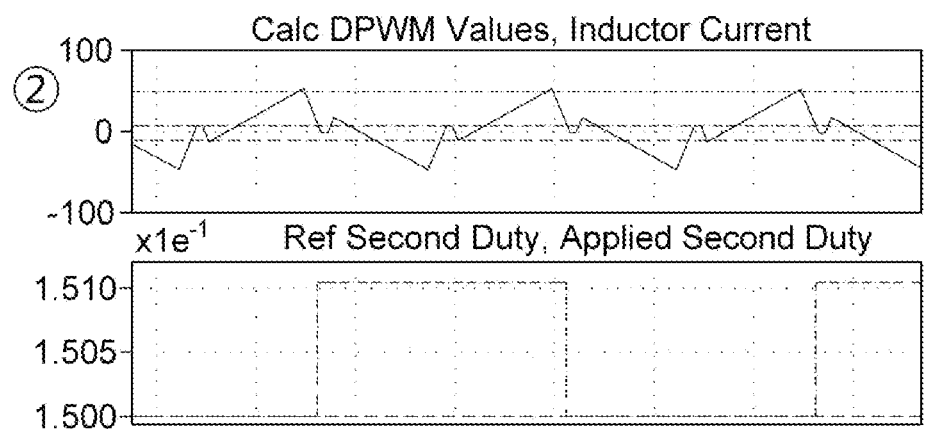
FIG. 10C is graphs magnifying part ② in the graphs in FIG. 10A.

FIG. 10A is graphs representing a simulation result under conditions of input voltage of 750V, output voltage of 6000V, and switching frequency of 8 kHz. FIG. 10B is graphs magnifying part ① in the graphs in FIG. 10A, and FIG. 10C is graphs magnifying part ② in the graphs in FIG. 10A. As illustrated, there exists a little ripple but it can be found that the second duty is formed and during the second duty, the output current increases as close as linear wave, and significant current occurs on the auxiliary inductor. More specifically, it can be found out that if the output current continuously increases from 0 to 20, the second duty is accordingly continuously outputted.

Figure 11A:
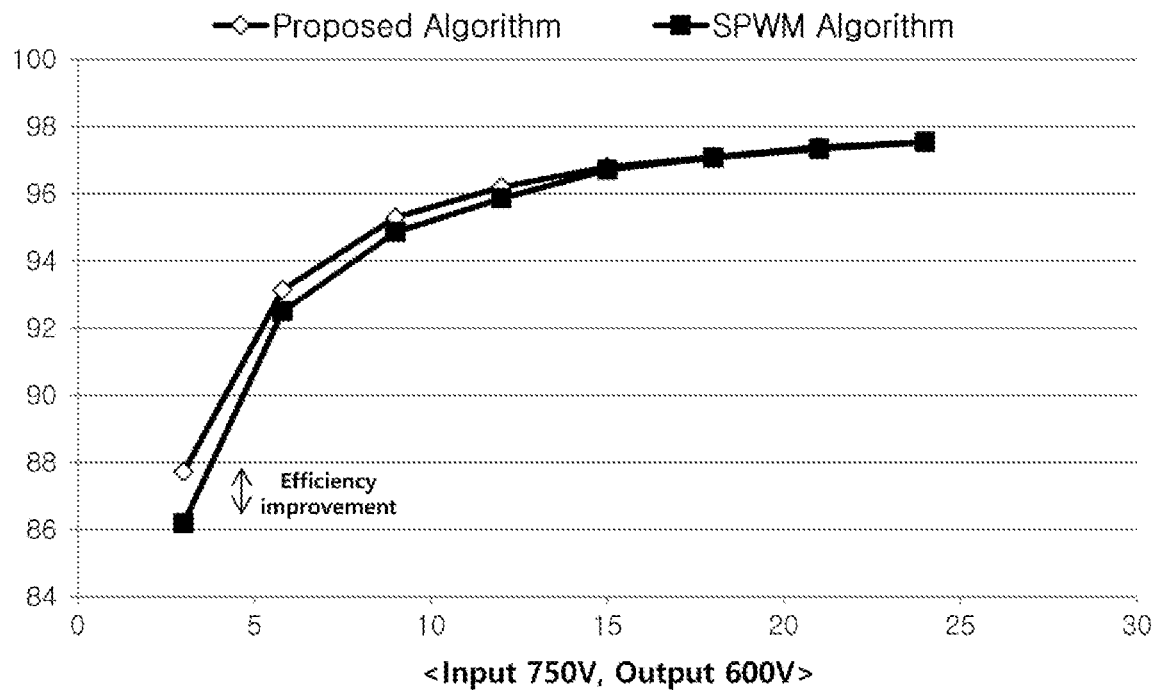
FIG. 11A is graphs illustrating conversion efficiency under a condition of input voltage of 750V, output voltage of 600V, switching frequency of 4 kHz, and an inductance of 110 μH on an auxiliary inductor on an input of a transformer, respectively, upon conversion in a hybrid algorithm of DPWM and SPWM and in an existing SPWM algorithm.

FIG. 11A is graphs illustrating conversion efficiency under a condition of input voltage of 750V, output voltage of 600V, switching frequency of 4 kHz, and an inductance of 110 µH on an auxiliary inductor on an input of a transformer, respectively, upon conversion in a hybrid algorithm of DPWM and SPWM, and in an existing SPWM algorithm. As illustrated, it can be found that the use of the hybrid algorithm of DPWM and SPWM in accordance with the present invention at low power, i.e., low current, apparently improves conversion efficiency and the conversion efficiency at high power is almost same in both algorithms.

Figure 11B:
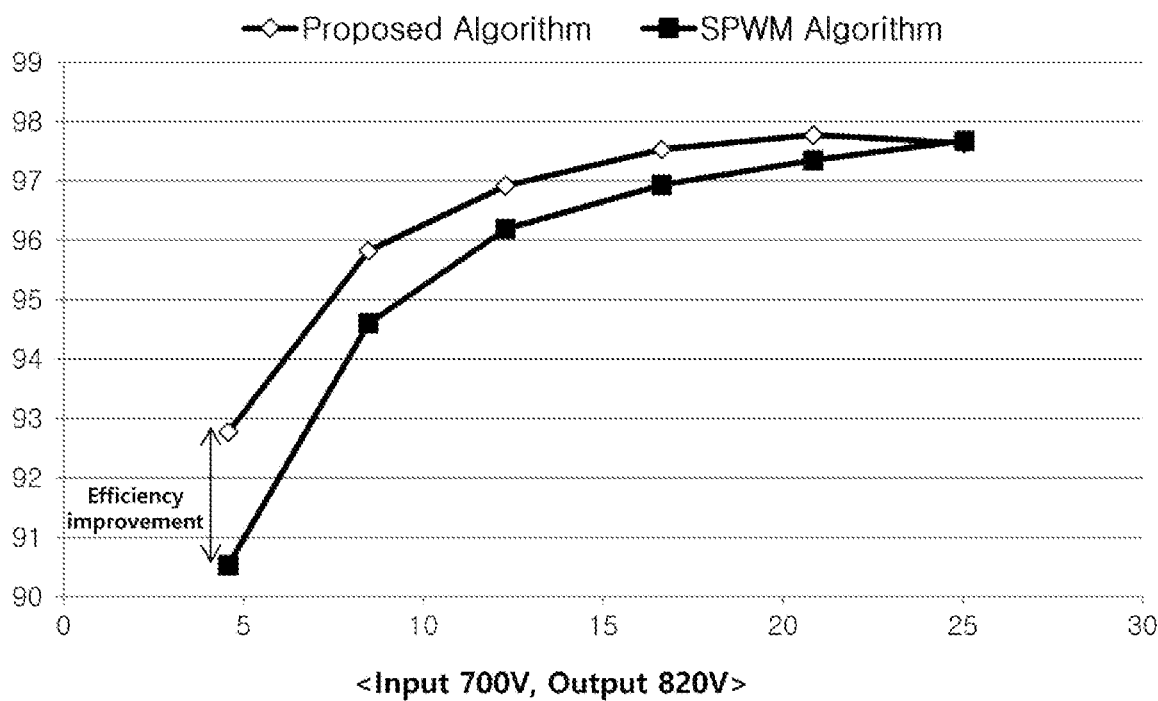
FIG. 11B is graphs illustrating conversion efficiency under a condition of input voltage of 700V, output voltage of 820V, switching frequency of 4 kHz, and an inductance of 110 μH on an auxiliary inductor on an input of a transformer, respectively, upon conversion in a hybrid algorithm of DPWM and SPWM and in an existing SPWM algorithm.

FIG. 11B is graphs illustrating conversion efficiency under a condition of input voltage of 700V, output voltage of 820V, switching frequency of 4 kHz, and an inductance of 110 µH on an auxiliary inductor on an input of a transformer, respectively, upon conversion in a hybrid algorithm of DPWM and SPWM and in an existing SPWM algorithm. As illustrated, it can be found that the use of the hybrid algorithm of DPWM and SPWM in accordance with the present invention at low power, i.e., low current, apparently improves conversion efficiency and the conversion efficiency at high power is almost same in both algorithms.

Figure 11C:
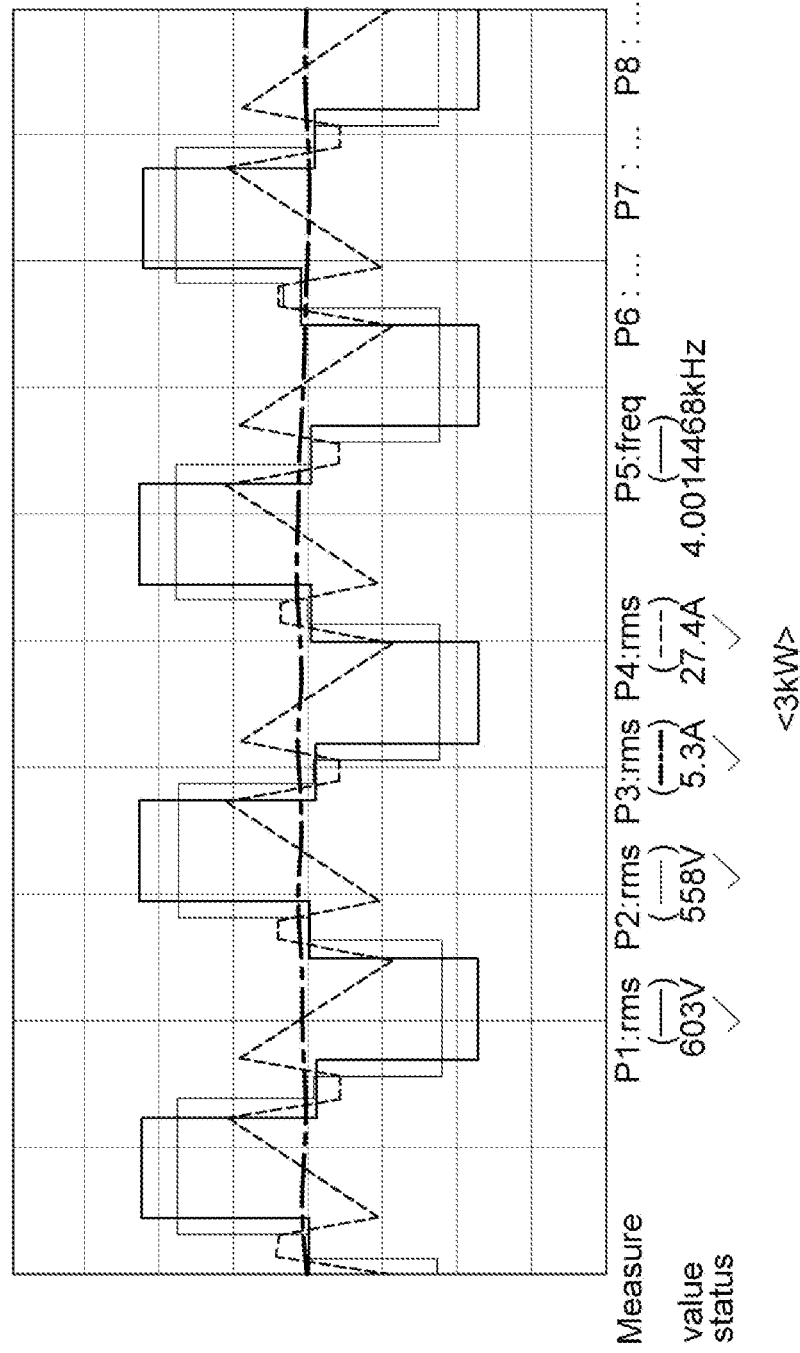
FIG. 11C is a waveform chart exemplifying primary-side and secondary-side voltage and inductor current upon conversion of 3 kW power under the condition specified in FIG. 11A.
Figure 11D:
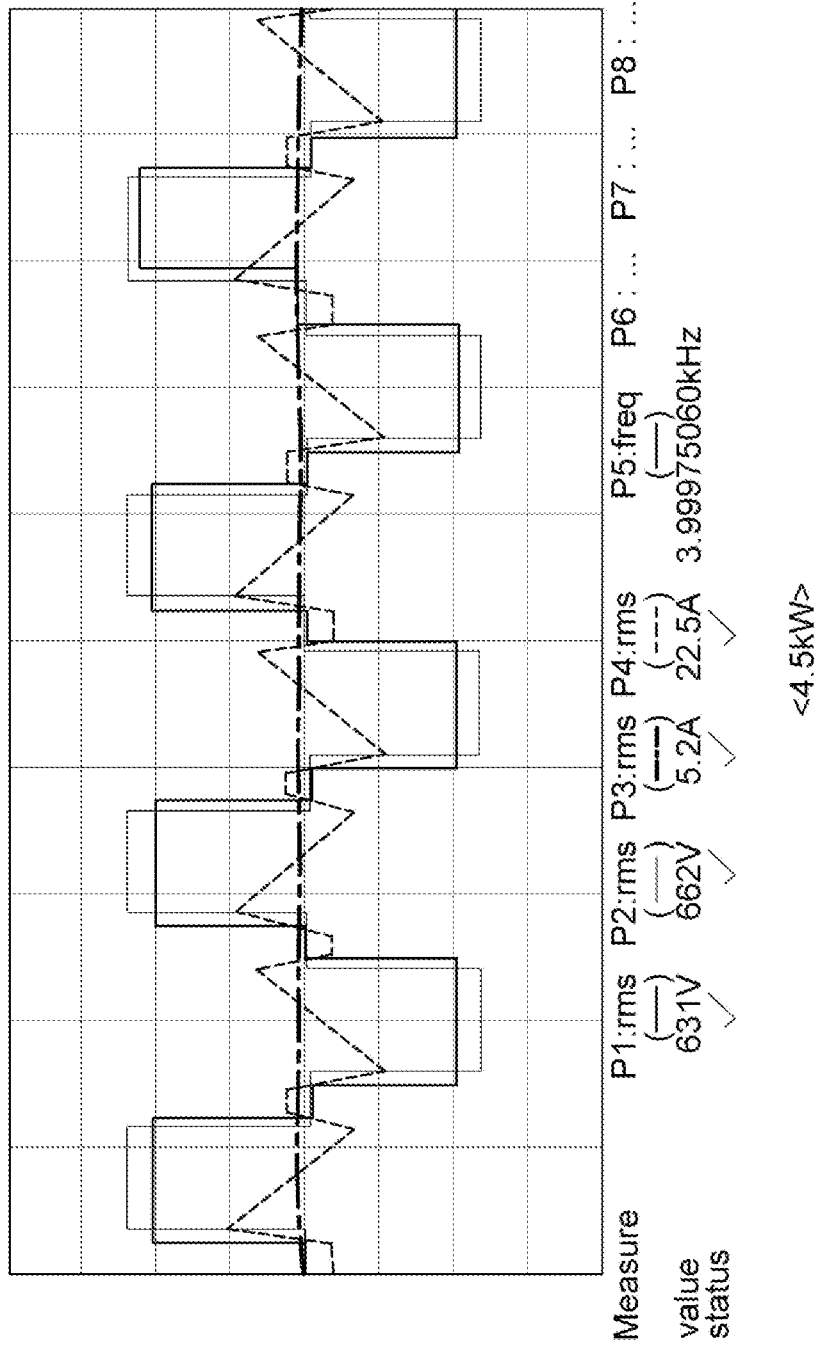
FIG. 11D is a waveform chart exemplifying primary-side and secondary-side voltage and inductor current upon conversion of 4.5 kW power under the condition specified in FIG. 11B.

Meanwhile, FIG. 11C is a waveform chart exemplifying primary-side and secondary-side voltage and inductor current upon conversion of 3 kW power under the condition specified in FIG. 11A, and FIG. 11D is a waveform chart exemplifying primary-side and secondary-side voltage and inductor current upon conversion of 4.5 kW power under the condition specified in FIG. 11B.

Figure 12A:
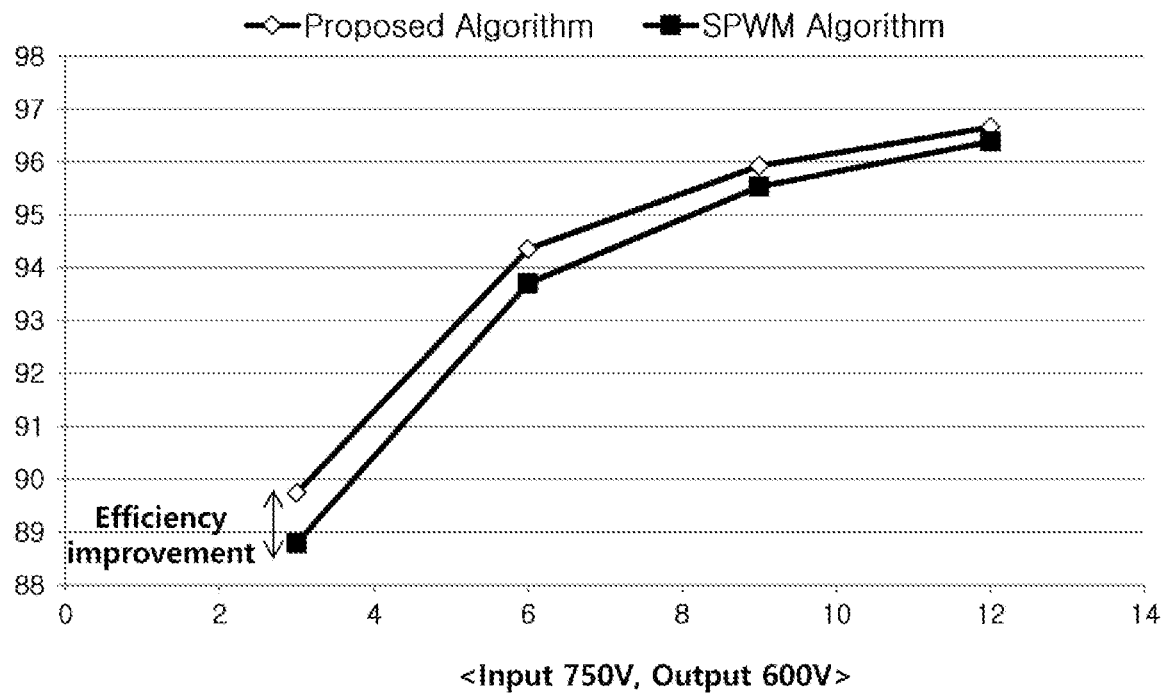
FIG. 12A is graphs illustrating conversion efficiency if under a condition of input voltage of 750V, output voltage of 600V, switching frequency of 8 kHz, and an inductance of 110 μH on an auxiliary inductor on an input of a transformer, respectively, upon conversion in a hybrid algorithm of DPWM and SPWM and in an existing SPWM algorithm.

FIG. 12A is graphs illustrating conversion efficiency if under a condition of input voltage of 750V, output voltage of 600V, switching frequency of 8 kHz, and an inductance of 110 µH on an auxiliary inductor on an input of a transformer, respectively, upon conversion in a hybrid algorithm of DPWM and SPWM and in an existing SPWM algorithm. As illustrated, it can be found that at low power, i.e., current, if the hybrid algorithm of DPWM and SPWM in accordance with the present invention is used, efficiency is significantly improved, and even at high power, the use of the hybrid algorithm of DPWM and SPWM in accordance with the present invention apparently improves efficiency.

Figure 12B:
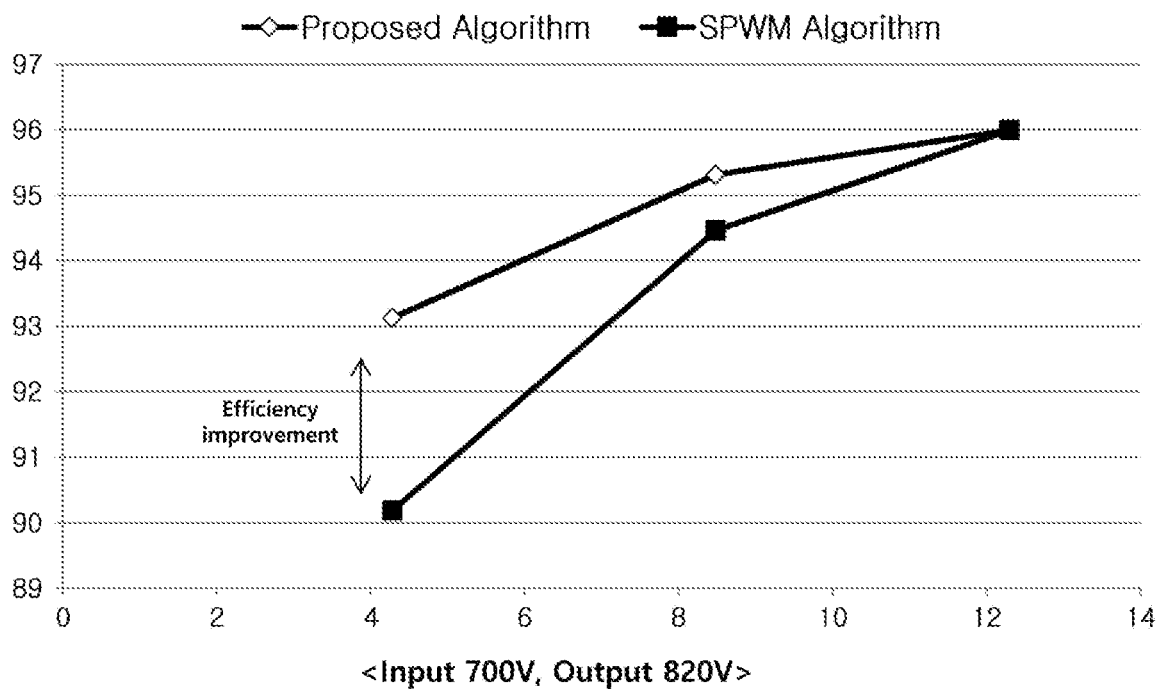
FIG. 12B is graphs illustrating conversion efficiency under a condition of input voltage of 700V, output voltage of 820V, switching frequency of 8 kHz, and an inductance of 110 μH on an auxiliary inductor on an input of a transformer, respectively, upon conversion in a hybrid algorithm of DPWM and SPWM and in an existing SPWM algorithm.

FIG. 12B illustrates conversion efficiency under a condition of input voltage of 700V, output voltage of 820V, switching frequency of 8 kHz, and an inductance of 110 µH on an auxiliary inductor on an input of a transformer, respectively, upon conversion in a hybrid algorithm of DPWM and SPWM and in an existing SPWM algorithm. As illustrated, it can be found that at low power, i.e., current, if the hybrid algorithm of DPWM and SPWM in accordance with the present invention is used, efficiency is significantly improved, and even at high power, the use of the hybrid algorithm of DPWM and SPWM in accordance with the present invention apparently improves efficiency.

Figure 12C:
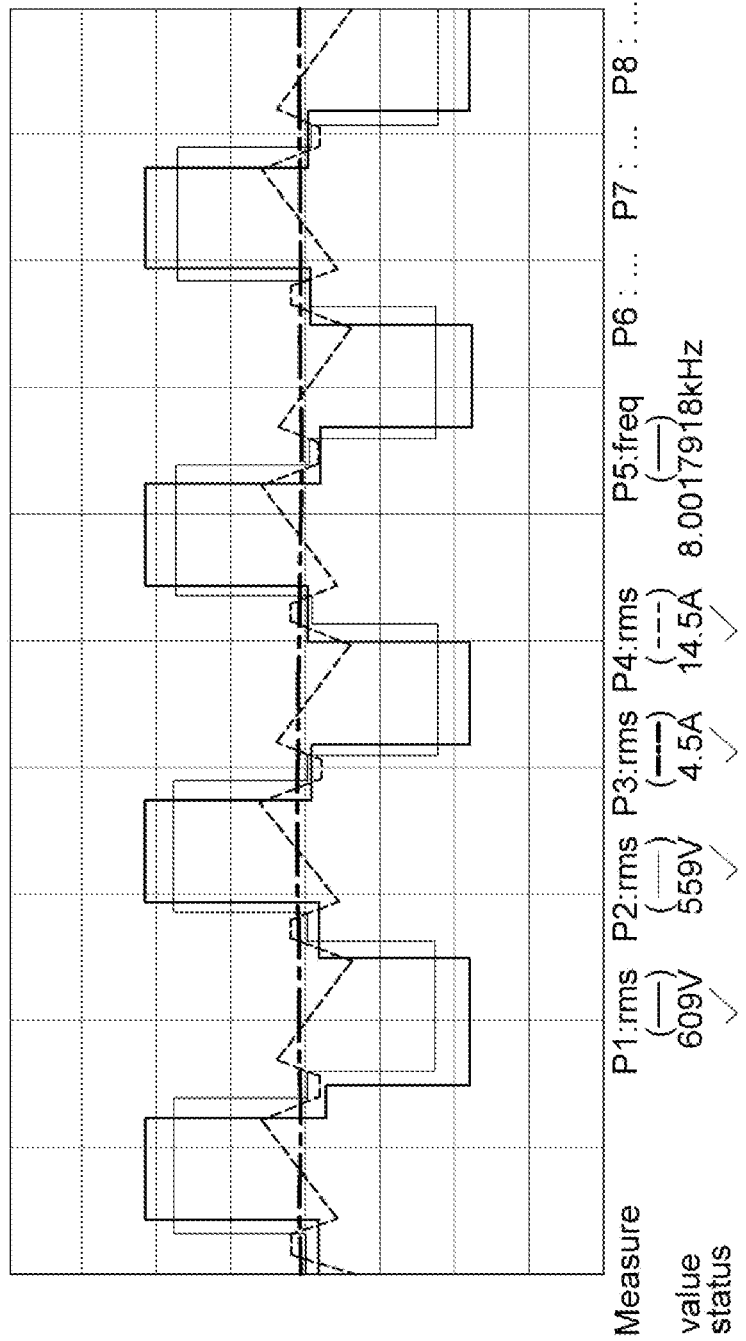
FIG. 12C is a waveform chart exemplifying primary-side and secondary-side voltage and inductor current upon conversion of 3 kW power under the condition specified in FIG. 12A.
Figure 12D:
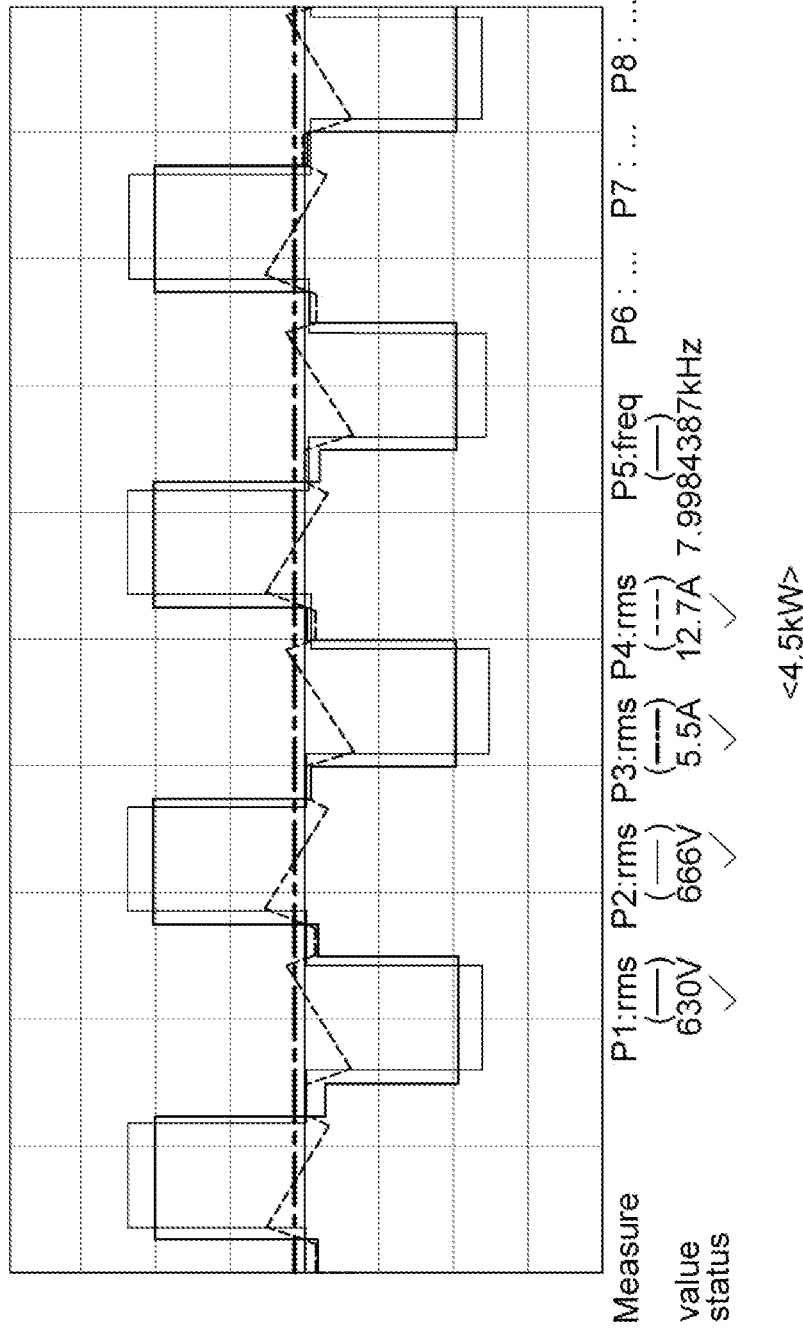
FIG. 12D is a waveform chart exemplifying primary-side and secondary-side voltage and inductor current upon conversion of 4.5 kW power under the condition specified in FIG. 12B.

Meanwhile, FIG. 12C is a waveform chart exemplifying primary-side and secondary-side voltage and inductor current upon conversion of 3 kW power under the condition specified in FIG. 12A, and FIG. 12D is a waveform chart exemplifying primary-side and secondary-side voltage and inductor current upon conversion of 4.5 kW power under the condition specified in FIG. 12B.

When FIGS. 11B and 12B are compared with FIG. 11A and FIG. 12A, it can be identified that when the switching frequency is higher, the effect of improving power efficiency under the hybrid algorithm of DPWM and SPWM in accordance with the thought of the present invention is slightly improved at not more than 12 kW, but the effect of improving power efficiency under the hybrid algorithm in accordance with the thought of the present invention is generally much greater than that under the increasing switching frequency.

It must be noted that the aforementioned example embodiment is for explanation, not for limitation. Besides, it will be understood by those skilled in the art to which the present invention pertains that a variety of example embodiments are possible within the scope of technical thoughts of the present invention.

REFERENCE NUMBERS

109: First switching unit
110: Transformer
111: First auxiliary inductor
112: Second auxiliary inductor
113: Second switching unit
114: Second capacity
115: Second voltage detecting unit
116: Second inductor
122: Switching control unit 122

INDUSTRIAL AVAILABILITY

The present invention relates to a power conversion method in a DC-DC converter, and is available in the field of converters.

What is claimed is:

1. A method for determining an algorithm of converting power at every control cycle for converting power, and converting the power under the determined algorithm, comprising steps of:

calculating average power of an inductor on an input of a transformer upon power conversion under a Single PWM (SPWM) algorithm at the control cycle;

calculating average power of the inductor on the input of the transformer upon power conversion under a Dual PWM (DPWM) algorithm at the control cycle; and converting the power under either of the algorithms of which the calculated average power of the inductor on the input of the transformer is greater, wherein the DPWM algorithm drives a primary-side voltage of the transformer in a square wave to which a primary duty phase is applied, and drives a secondary-side voltage of the transformer in a square wave to which a secondary duty phase is applied, wherein, upon step-up, the SPWM algorithm drives the secondary-side voltage of the transformer in the square wave, and drives the primary-side voltage of the transformer in the square wave to which a duty phase is applied, wherein, upon step-up, at the step of calculating the average power of the inductor on the input of the transformer upon power conversion under the SPWM algorithm at the control cycle, the average power is obtained under following equation:

$$I_{s1} = \frac{V_{pri}}{\omega_{sw}L}\left(\frac{-\pi}{2} + g\left(\frac{\pi - \beta}{2}\right)\right)$$

$$I_{s2} = -\frac{V_{pri}}{\omega_{sw}L}\left(\phi - \frac{\pi}{2} + g\frac{\pi - \beta}{2}\right)$$

$$I_{s3} = \frac{V_{pri}}{\omega_{sw}L}\left(\beta - \phi - \frac{\pi}{2} + g\left(\frac{\pi - \beta}{2}\right)\right)$$

$$P_{ave} = V_s I_{ave} = V_s(\pi - \beta)\frac{I_2^2 - I_3^2}{(abs(I_2) + abs(I_3))}\frac{1}{\pi}\frac{1}{2}$$

($V_{pri}$: Primary-side voltage, $V_{sec}=V_s$: Secondary-side voltage

Ø: Phase difference between the primary-side voltage and the secondary-side voltage α: Duty phase of the primary-side voltage, β: Duty phase of the secondary-side voltage $\omega_{sw}$: Angular velocity at a switching frequency of a switching element g: Input-output voltage ratio on the primary and secondary sides $I_{s1}=I_1$, $I_{s2}=I_2$, $I_{s3}=I_3$ $P_{ave}$: Average power $I_1$: Current value of the inductor at rising time $\theta_0$ of a primary-side voltage waveform without any duty $I_2$: Current value of the inductor at rising time $\theta_1$ after a duty of a secondary-side voltage waveform $I_3$: Current value of the inductor at falling time $\theta_2$ of the secondary-side voltage waveform L: Inductance $I_{ave}$: Average current, wherein, upon step-up, at the step of calculating the average power of the inductor on the input of the transformer upon power conversion under the DPWM algorithm at the control cycle, the average power is obtained under following equation:

$$I_{d1} = \frac{V_{pri}}{\omega_{sw}L}\left(\frac{\alpha - \pi}{2} + g\left(\frac{\pi - \beta}{2}\right)\right)$$

$$I_{d2} = -\frac{V_{pri}}{\omega_{sw}L}\left(\phi + \frac{\alpha - \pi}{2} + g\frac{\pi - \beta}{2}\right)$$

-continued $$I_{d3} = \frac{V_{pri}}{\omega_{sw}L}\left(\beta - \phi - \frac{\alpha + \pi}{2} + g\frac{\pi - \beta}{2}\right)$$

$$P_{ave} = V_s I_{ave} = V_s(\pi - \beta)\frac{I_2^2 - I_3^2}{(abs(I_2) + abs(I_3))}\frac{1}{\pi}\frac{1}{2}$$

$V_{pri}$: Primary-side voltage, $V_{sec}=V_s$: Secondary-side voltage

Ø: Phase difference between the primary-side voltage and the secondary-side voltage α: Duty phase of the primary-side voltage, β: Duty phase of the secondary-side voltage $\omega_{sw}$: Angular velocity at a switching frequency of a switching element g: Input-output voltage ratio on the primary and secondary sides $I_{d1}=I_1$, $I_{d2}=I_2$, $I_{d3}=I_3$ $P_{ave}$: Average power $I_1$: Current value of the inductor at rising time $\theta_0$ before a duty of the primary-side voltage waveform $I_2$: Current value of the inductor at rising time $\theta_2$ after a duty of the secondary-side voltage waveform $I_3$: Current value of the inductor at falling time $\theta_3$ of the secondary-side voltage waveform L: Inductance $I_{ave}$: Average current.

2. The method of claim 1, wherein, at the step of calculating the average power of the inductor on the input of the transformer upon power conversion under the DPWM algorithm at the control cycle, the DPWM algorithm with maximum duty in a given step-up or step-down condition at the control cycle is selected.

3. The method of claim 1, wherein the average power of the inductor on the input of the transformer is calculated upon power conversion under the SPWM algorithm and the DPWM algorithm by applying a primary-side voltage value and a secondary-side voltage value of the transformer.

4. The method of claim 1, wherein upon step-down, the SPWM algorithm drives the primary-side voltage of the transformer in the square wave, and drives the secondary-side voltage of the transformer in the square wave to which the duty phase is applied.

5. The method of claim 4, wherein, upon step-down, at the step of calculating the average power of the inductor on the input of the transformer upon power conversion under the SPWM algorithm at the control cycle, the average power is obtained under following equation:

$$I_{s1} = \frac{V_{pri}}{\omega_{sw}L}\left(\frac{\alpha - \pi}{2} + g\left(\frac{\pi}{2} + \phi\right)\right)$$

$$I_{s2} = \frac{V_{pri}}{\omega_{sw}L}\left(\frac{\alpha - \pi}{2} + g\frac{\pi}{2}\right)$$

$$I_{s3} = \frac{V_{pri}}{\omega_{sw}L}\left(\frac{-\alpha + \pi}{2} - g\left(\frac{\pi}{2} - \alpha - \phi\right)\right)$$

$$P_{ave} = V_p I_{ave} = V_p(\pi - \alpha)\frac{I_3^2 - I_1^2}{(abs(I_3) + abs(I_1))}\frac{1}{\pi}\frac{1}{2}$$

($V_{pri}=V_p$: Primary-side voltage, $V_{sec}$: Secondary-side voltage

Ø: Phase difference between the primary-side voltage and the secondary-side voltage α: Duty phase of the primary-side voltage $\omega_{sw}$: Angular velocity at the switching frequency of the switching element g: Input-output voltage ratio on the primary and secondary sides $I_{s1}=I_1$, $I_{s2}=I_2$, $I_{s3}=I_3$ $P_{ave}$: Average power), $I_1$: Current value of the inductor at rising time $\theta_1$ after a duty of the primary-side voltage waveform $I_2$: Current value of the inductor at rising time $\theta_0$ of the secondary-side voltage waveform without any duty $I_3$: Current value of the inductor at falling time $\theta_2$ of the primary-side voltage waveform L: Inductance $I_{ave}$: Average current), wherein, upon step-down, at the step of calculating the average power of the inductor on the input of the transformer upon power conversion under the DPWM algorithm at the control cycle, the average power is obtained under following equation:

$$I_{d1} = \frac{V_{pri}}{\omega_{sw}L}\left(\frac{\alpha-\pi}{2} + g\left(\frac{\pi-\beta}{2} + \phi\right)\right)$$

$$I_{d2} = \frac{V_{pri}}{\omega_{sw}L}\left(\frac{\alpha-\pi}{2} + g\frac{\pi-\beta}{2}\right)$$

$$I_{d3} = \frac{V_{pri}}{\omega_{sw}L}\left(\frac{-\alpha+\pi}{2} - g\left(\frac{\pi+\beta}{2} - \alpha - \phi\right)\right)$$

$$P_{ave} = V_p I_{ave} = V_p(\pi-\alpha)\frac{I_3^2 - I_1^2}{(\text{abs}(I_3)+\text{abs}(I_1))}\frac{1}{\pi}\frac{1}{2}$$

($V_{pri}=V_p$: Primary-side voltage, $V_{sec}$: Secondary-side voltage

Ø: Phase difference between the primary-side voltage and the secondary-side voltage α: Duty phase of the primary-side voltage, β: Duty phase of the secondary-side voltage $\omega_{sw}$: Angular velocity at the switching frequency of the switching element g: Input-output voltage ratio on the primary and secondary sides $I_{d1}=I_1$, $I_{d2}=I_2$, $I_{d3}=I_3$ $P_{ave}$: Average power $I_1$: Current value of the inductor at rising time $\theta_1$ after a duty of the primary-side voltage waveform $I_2$: Current value of the inductor at rising time $\theta_0$ before a duty of the secondary-side voltage waveform $I_3$: Current value of the inductor at falling time $\theta_2$ of the primary-side voltage waveform L: Inductance $I_{ave}$: Average current).

6. The method of claim 1, further including a step of confirming soft switching, if the DPWM algorithm is selected, and control is made under the selected algorithm.

7. The method of claim 6, wherein the step of confirming the soft switching is performed by means of inspecting whether $I_{d1}$, $I_{d2}$, and $I_{d3}$ have corresponding signs under the equation.

8. The method of claim 5, further including a step of confirming soft switching, if the DPWM algorithm is selected, and control is made under the selected algorithm.

\* \* \* \* \*